US 009998368B2

(12) United States Patent
Chen et al.

(10) Patent No.: US 9,998,368 B2
(45) Date of Patent: Jun. 12, 2018

(54) ZONE ROUTING SYSTEM

(71) Applicant: Futurewei Technologies, Inc., Plano, TX (US)

(72) Inventors: Huaimo Chen, Bolton, MA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 69 days.

(21) Appl. No.: 14/737,142

(22) Filed: Jun. 11, 2015

(65) Prior Publication Data

US 2016/0366051 A1 Dec. 15, 2016

(51) Int. Cl.
- *H04J 3/14* (2006.01)
- *H04L 12/723* (2013.01)
- *H04L 12/751* (2013.01)
- *H04L 12/721* (2013.01)

(52) U.S. Cl.
CPC .............. *H04L 45/50* (2013.01); *H04L 45/02* (2013.01); *H04L 45/12* (2013.01)

(58) Field of Classification Search
CPC ......... H04L 45/22; H04L 45/28; H04L 45/50; H04L 45/16
See application file for complete search history.

(56) References Cited

U.S. PATENT DOCUMENTS

| | | | | |
|---|---|---|---|---|
| 6,069,889 A * | 5/2000 | Feldman | ............ | H04L 12/4608 370/351 |
| 6,856,991 B1 * | 2/2005 | Srivastava | ........ | H04L 29/12066 |
| 8,014,380 B2 * | 9/2011 | Lewis | ................. | H04L 12/4633 370/351 |
| 8,599,849 B2 * | 12/2013 | Aggarwal | ............... | H04L 12/66 370/390 |
| 2002/0057691 A1 * | 5/2002 | Enoki | ..................... | H04L 45/00 370/392 |
| 2004/0081085 A1 * | 4/2004 | De Cnodder | ........... | H04L 45/00 370/225 |
| 2005/0220030 A1 * | 10/2005 | Nagami | .................. | H04L 45/50 370/241 |

(Continued)

OTHER PUBLICATIONS

Narten, et al., "Guidelines for Writing an IANA Considerations Section in RFCs," draft-iesg-iana-considerations-05.txt, Sep. 17, 1998, 11 pages.

(Continued)

*Primary Examiner* — Melanie Jagannathan
(74) *Attorney, Agent, or Firm* — Conley Rose, P.C.

(57) ABSTRACT

An apparatus for zone routing, comprising a transmitter, a receiver, and a processor coupled to the transmitter and the receiver, wherein the processor is configured to determine a path through a network, wherein the path extends from an ingress edge node of the network to a first egress edge node of the network, obtain a global identifier (ID) for identifying a label-switched path (LSP) along the path, send, via the transmitter, a first LSP creation request message to the first egress edge node requesting creation of the LSP, wherein the first LSP creation request message comprises the global ID, and receive, via the receiver, a LSP creation response message from the ingress edge node indicating a creation status of the LSP in response to the first LSP creation request message.

14 Claims, 22 Drawing Sheets

(56) References Cited

U.S. PATENT DOCUMENTS

| | | | |
|---|---|---|---|
| 2006/0036892 A1* | 2/2006 | Sunna | H04L 12/4633 714/4.1 |
| 2006/0146696 A1* | 7/2006 | Li | H04L 12/5695 370/218 |
| 2007/0237097 A1* | 10/2007 | Maharana | H04L 12/462 370/255 |
| 2009/0067348 A1* | 3/2009 | Vasseur | H04L 45/04 370/256 |
| 2009/0103555 A1* | 4/2009 | Bitar | H04L 45/302 370/413 |
| 2009/0154346 A1* | 6/2009 | Sun | H04L 12/1863 370/228 |
| 2009/0245253 A1* | 10/2009 | Chen | H04L 12/18 370/390 |
| 2010/0142531 A1* | 6/2010 | Kansara | H04L 45/04 370/392 |
| 2011/0199891 A1* | 8/2011 | Chen | H04L 45/22 370/218 |
| 2011/0211445 A1* | 9/2011 | Chen | H04L 45/42 370/221 |
| 2012/0008632 A1* | 1/2012 | Liu | H04L 47/724 370/395.5 |
| 2014/0059216 A1* | 2/2014 | Jerrim | H04L 67/104 709/224 |
| 2015/0124830 A1* | 5/2015 | Hu | H04L 45/42 370/392 |
| 2015/0146536 A1* | 5/2015 | Minei | H04L 45/507 370/236 |
| 2015/0163125 A1* | 6/2015 | Caviglia | H04L 45/44 370/254 |
| 2016/0119821 A1* | 4/2016 | Ramachandran | H04L 45/28 370/392 |
| 2016/0261494 A1* | 9/2016 | Dai | H04L 45/507 |

OTHER PUBLICATIONS

Coltun, et al.,"The OSPF Address Resolution Advertisement Option," draft-ietf-ospf-ara-02.txt, Mar. 1998, 40 pages.
Coltun, et al., "The OSPF NSSA Option," RFC 1587, Mar. 1994, 16 pages.
Moy, "Multicast Extensions to OSPF," RFC 1584, Mar. 1994, 70 pages.
Moy, "OPSF Database Overflow," RFC 1765, Mar. 1995, 9 pages.
Moy, "Extending OSPF to Support Demand Circuits," RFC 1793, Apr. 1995, 32 pages.
Baker, et al., "OSPF Version 2 Management Information Base," RFC 1850, Nov. 1995, 80 pages.
Murphy, et al., "OSPF with Digital Signatures," RFC 2154, Jun. 1997, 29 pages.
Moy, "OSPF Version 2," RFC 2328, Apr. 1998, 244 pages.
Coltun, "The OSPF Opaque LSA Option," RFc 2370, Jul. 1998, 15 pages.

* cited by examiner

ZONE ROUTING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Routing is a process of forwarding network traffic to destinations. Source routing is a mechanism that partially or completely specifies, within a source route header, a route that a packet may travel via a network. The source route header may comprise a strict list or a loose list of links and/or nodes to traverse. A strict list explicitly lists all of the links and/or nodes a packet may be transported over, whereas a loose list specifies one or more links and/or nodes that the packet may traverse through to reach a destination, but may not include all the links and/or nodes that a packet may traverse through to reach the destination.

Segment routing (SR) is based on source routing, where a node steers a packet through an ordered list of instructions, called segments. A segment may represent any instruction, and may be topological or service-based. A segment may be identified by a segment label. In an SR network, a route may be formed from a plurality of segments and may be indicated as an ordered list of segment labels in a source route header.

SR may be applied to Multiprotocol Label Switching (MPLS) networks (e.g., via MPLS labels) and Internet Protocol version 6 (IPv6) networks (e.g., via routing extension headers). Since in source routing the routes are pre-selected and routing information is inserted into packets at a sender node (e.g., an ingress node of an SR domain), SR may be performed without employing a Resource Reservation Protocol (RSVP) and/or a label Distribution Protocol (LDP).

SUMMARY

In one embodiment, an apparatus for zone routing comprises a transmitter, a receiver, and a processor coupled to the transmitter and the receiver, wherein the processor is configured to determine a path through a network, wherein the path extends from an ingress edge node of the network to a first egress edge node of the network, obtain a global identifier (ID) for identifying a label-switched path (LSP) along the path, send, via the transmitter, a first LSP creation request message to the first egress edge node requesting creation of the LSP along the path, wherein the first LSP creation request message comprises the global ID, and receive, via the receiver, a LSP creation response message from the ingress edge node indicating a creation status of the LSP along the path in response to the first LSP creation request message.

In another embodiment, a network element (NE) in a zone routing network, comprising a memory configured to store a forwarding information base (FIB) comprising forwarding instructions, a receiver configured to receive a first LSP creation request message from a network controller requesting creation of a first LSP through the network, wherein the NE is an egress node of the first LSP, and wherein the first LSP creation request message comprises a first global ID of the first LSP, a processor coupled to the receiver and the memory, wherein the processor is configured to allocate a first local label for the first LSP, generate a first FIB entry according to the first local label, and generate a second LSP creation request message according to the first LSP creation request message and the first local label, and a transmitter coupled to the processor and configured to send the second LSP creation request message to a next upstream node along the first LSP.

In yet another embodiment, a zone routing method implemented by a network controller comprises determining a path through a network, wherein the path traverses from an ingress edge node of the network to an egress edge node of the network through one or more internal nodes of the network, obtaining a global ID for identifying a LSP along the path, sending a LSP creation request message to the egress edge node requesting creation of the LSP along the path, wherein the LSP creation message indicates the global ID and a node sequence for the ingress edge node, the internal nodes, and the egress edge node, and receiving a LSP creation response message from the ingress edge node indicating a creation status of the LSP in response to the LSP creation request message.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Figure 1:
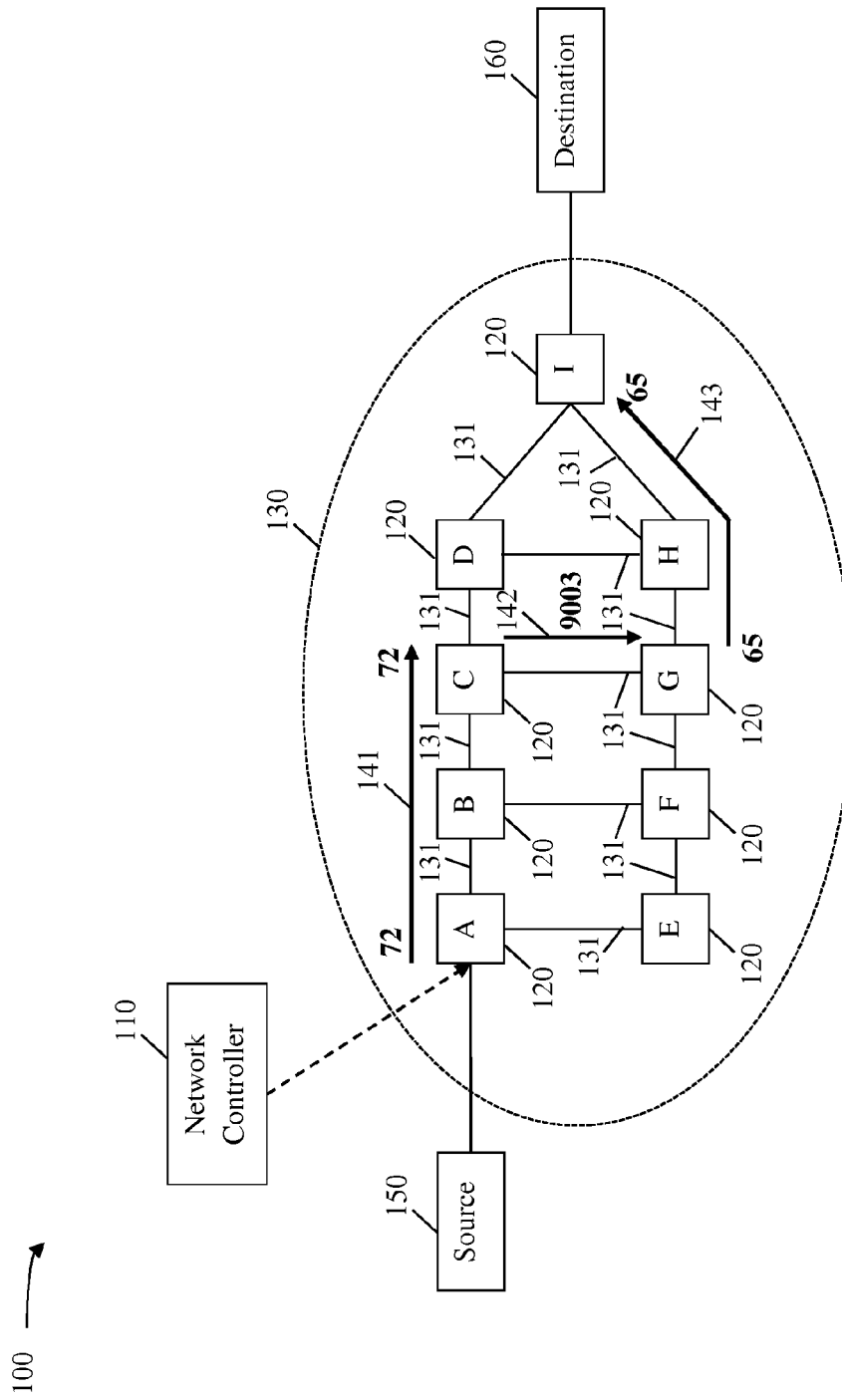
FIG. 1 is a schematic diagram of an embodiment of a segment routing (SR) network system.

FIG. 1 is a schematic diagram of an embodiment of a segment routing (SR) network system 100. The system 100 comprises a network controller 110 and a network 130 comprising a plurality of network nodes 120 (e.g., A, B, C, D, E, F, G, H, and I) interconnected by a plurality of links 131. The links 131 may comprise physical links, such as fiber optic links and/or electrical links, logical links (e.g. MPLS tunnels), or combinations thereof used to transport data. The network controller 110 can be communicatively coupled to the network 130. The network 130 employs SR to transport packets through the network nodes 120 between a source 150 and a destination 160. The source 150 may be any network device that is suitable for sourcing packets (e.g., to generate packets) and the destination 160 may be any network device that is suitable for sinking (e.g., to accept packets) packets. To employ SR, the network nodes 120 operate under a single networking domain, which may also be referred to as an SR domain. In an embodiment, the network nodes 120 may be operating under one networking domain and the source 150 and/or the destination 160 may be operating under other networking domains, which may employ any types of routing methods. In another embodiment, the network nodes 120, the source 150, and/or the destination 160 may be operating under the same networking domain. It should be noted that the source 150 and the destination 160 may not be directly connected to the network 130. For example, the source 150 and the destination 160 may be connected to intervening networks (not shown), which are interconnected by the network 130.

The network controller 110 may be a virtual machine (VM), a hypervisor, or any other device configured to manage the network 130, for example, by maintaining the network topology and statuses of the network 130 and determining routes through the network 130. The network controller 110 may be any types of network controller, such as a centralized controller or a distributed controller. In an embodiment, the network controller 110 is a software-defined networking (SDN) controller, such as an OpenFlow-enabled controller. In such an embodiment, the forwarding plane is decoupled from the control plane, and the network controller 110 configures each of the network nodes 120 with forwarding instructions, for example, in the form of one or more flow tables. It should be noted that although FIG. 1 depicts the network controller 110 as only coupled to the network node A 120, the network controller may be coupled to any of the network nodes 120 in the network 130.

In some embodiments, the network controller 110 may explicitly specify some or all connections and/or forwarding paths over which a data packet may traverse in the network 130. A route in the network 130 is identified by segment labels. Segment labels may be globally significant or locally significant in the network 130 (e.g., an SR domain). Global segment labels may be referred to as node segment ID and local segment labels may be referred to as adjacency segment IDs. Global segment labels may be managed and/or allocated by an operator of the network 130 and/or the network controller 110, whereas local segment labels may be assigned by the network nodes 120. For example, during a network setup phase, the network controller 110 may establish and collect all labeling information of the network 130. Subsequently, the network controller 110 may select a route for transporting packets from the source 150 to the destination 160, for example, through a first segment 141, a second segment 142, and a third segment 143 to traverse from network node A 120 to network node I 120. As shown, the first segment 141 is represented by a first segment label 72, the second segment 142 is represented by a second segment label 9003, and the third segment 143 is represented by a third segment label 65. Thus, the network controller 110 may configure the network node A 120 to forward packets from the source 150 to the destination 160 over the selected route by providing a segment label list {72, 9003, 65}. In an embodiment, the first segment label 72 and the third segment label 65 are node segment IDs, and the second segment label 9003 is an adjacent segment ID. The route identified by the segment label list {72, 9003, 65} may be referred to as a LSP.

The network nodes 120 may be switches, routers, bridges, and/or any other network devices suitable for forwarding data in the network 130. The network nodes 120 are configured to assign local segment labels for adjacent links 131, advertise local segment labels, and install labels advertised by neighboring network nodes 120, for example, via an Interior Gateway Protocol (IGP) or a Border Gateway Protocol (BGP). In an embodiment of an SDN-based network, each network node 120 receives forwarding instructions from the network controller 110 and forwards data packets in the network 130 according to the received forwarding instructions. In the network 130, the network nodes 120 may act as an ingress node, an egress node, and/or a transit node for one or more packet flows, for example, associated with different sources 150 and/or different destinations 160.

When a network node 120 is an ingress node, the network node 120 is configured to direct packets from a source 150 through the network 130 towards a destination 160 of the packets. For example, the network node 120 receives a plurality of routes from the network controller 110 for routing packets through the network 130 and stores the plurality of routes, for example, in a flow table or any other forwarding information bases. Upon receiving a packet from the source 150, the network node 120 identifies a route (e.g., via source-destination match) stored in the flow table, encapsulates the packet with the route (e.g., carried in the header), and forwards the packet to a next hop node according to the identified route. The route may be described by an ordered list of segment labels or a stack of labels, for example, {72, 9003, 65}.

When a network node 120 is a transit node, the network node 120 is physically and/or logically located between an ingress node and an egress node of a forwarding path. The network node 120 is configured to receive and forward packets in the network 130 via stateless connections. For example, when the network node 120 receives a packet from an upstream node (e.g., towards a source 150), the network node 120 forwards the packet to a downstream node (e.g., towards a destination 160) according to the route information carried in the header that is encapsulated on the packet without referencing a connection-specific table. In some embodiments, each transit node may perform a label pop operation on the label stack carried in a packet to expose a next segment prior to forwarding the packet.

When a network node 120 is an egress node, the network node 120 is configured to deliver packets to a destination 160 of the packets. For example, upon receiving a packet for the destination 160, the network node 120 removes the packet header that carries the routes that were used to forward the packet through network 130 prior to transmitting the packet to its destination 160.

As shown in FIG. 1, the source 150 is connected to the network node A 120, and the destination 160 is connected to the network node I 120. Thus, in the example shown, the network node A 120 is an ingress node and the network node I 120 is an egress node of the network 130 for the pair of source 150 and destination 160, which may or may not be directly connected to the same network 130. The network controller 110 configures the network node A 120 with a route (e.g., by combining the first segment 141, the second segment 142, and the third segment 143) indicated by the segment label list {72, 9003, 65} for forwarding packets between the source 150 and the destination 160. When the network node A 120 receives a packet from the source 150 destined to the destination 160, the network node A 120 encapsulates the packet with the segment label list {72, 9003, 65} and forwards the packet to the network node B 120 according to the first segment label 72. Subsequent network nodes 120 along the route forward the packet according to the routing information carried in the packet header. For example, the network node B 120 forwards the packet to the network node C 120 according to the first segment label 72. The network node C 120, which is a last node in the first segment 141, pops (e.g., removes) the first segment label 72 and forwards the packet to the network node G 120 according to the second segment label 9003. The network node G 120, which is a last node in the second segment 142, pops the second segment label 9003 and forwards the packet to the network node H 120 according to the third segment label 65. The network node H 120 forwards the packet to the network node I 120 according to the third segment label 65. The network node I 120, which is a last node in the route, removes the third segment label 65 from the packet header before delivering the packet to the destination 160.

Although SR may create LSPs without employing an RSVP and/or a LDP, SR includes drawbacks. For example, in order to support SR, all network nodes 120 in the network 130 are required to be equipped with sufficient memory and/or processing capacity to support the maximum depth of a label stack, which may be large when the size of the network 130 is large or when there is a large number of segments in the network 130. Thus, a network 130 may not be easily migrated to employ an SR scheme without service interruptions, since some network nodes 120 may require hardware upgrades when migrating to the SR scheme. In addition, the packet overhead created by the label stacks may lead to inefficient usage of network bandwidth. Further, multicast support in SR may be difficult when a single packet is required to be transported to different destinations over different routes. Scalability for an SR network may also be limited due to the flooding mechanisms (e.g., through IGP) employed for exchanging route information.

Zone routing (ZR) may enable a network, such as a local area network (LAN), a wide area network (WAN), and/or a metropolitan network (MAN), to employ a hybrid networking scheme. For example, a portion of an existing network may be converted into a zone, which may employ a networking scheme, such as a centralized controlled scheme (e.g., SDN), different from a networking scheme employed by the network. A zone may refer to a logical group of network nodes, such as the network nodes 120, a networking domain, or an area within the network. Alternatively, a network may be divided into multiple zones that operate independently of each other. For example, each zone may maintain topology information within the zone and may not communicate the internal topology information external to the zone.

Figure 2:
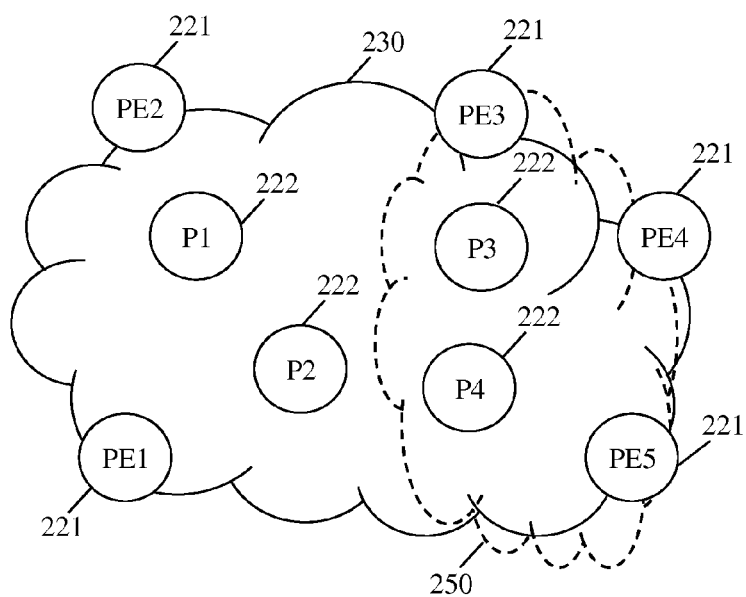
FIG. 2 is a schematic diagram of an embodiment of a zoned network system.

FIG. 2 is a schematic diagram of an embodiment of a zoned network system 200. The system 200 comprises a network 230, which may be a LAN, a WAN, a MAN, or any type of network suitable for transporting data. The network 230 may operate under one or more network domains. For example, a portion of the network 230 (e.g., a network zone 250) may operate under a separate domain and may be similar to the network 130. The network 230 comprises a plurality of edge nodes 221 (e.g., PE1, PE2, PE3, PE4, and PE5) and a plurality of internal nodes 222 (e.g., P1, P2, P3, and P4) communicatively coupled to each other (but not necessarily to all other nodes within the network 230). The edge nodes 221 and the internal nodes 222 are similar to the network nodes 120. The edge nodes 221 are network nodes that are located at the edge or boundary of the network 230. The edge nodes 221 act as access points or interconnection points between the network 230 and other networks, which may be similar to the network 230 or different from the network 230, or other network domains. For example, the edge nodes 221 may establish networking sessions and/or services with different networks, but may not exchange topology information across the different networks. The internal nodes 222 are network nodes that are located within an area of the network 230.

As shown, the network zone 250 may be formed from a group of the edge nodes 221 (e.g., PE3, PE4, and PE5) and a group of the internal nodes 222 (e.g., P3 and P4). However, the network zone 250 is not required to include edge nodes of the network 230 and/or is not required to include internal nodes of the network 230. The network zone 250 may be a topology transparent zone and may be operated independently from the remaining portion of the network 230. For example, the network zone 250 may employ a centralized network protocol, such as an SDN-based network protocol and the remaining portion of the network 230 may employ a non-SDN-based network protocols. In an embodiment, the network zone 250 may be established over time, where a portion of the edge nodes 221 and/or a portion of the internal nodes 222 are gradually migrated into the network zone 250. As described above, SR may not be suitable for migration and may comprise limited scalability. Thus, a more efficient routing scheme may benefit a network 230 that employs a hybrid networking scheme.

Disclosed herein are various embodiments of an efficient ZR scheme for creating LSPs, deleting LSPs, and packet routings. A ZR system comprises a ZR controller managing a network zone comprising a plurality of edge nodes and a plurality of internal nodes. The edge nodes are located at the edge, border, or boundary of the network zone. The internal nodes are located within the area of the network zone. The ZR controller communicates with the edge nodes to create and/or delete LSPs through the network zone, but does not communicate with the internal nodes. The creations and/or deletions of LSPs are performed without employing an RSVP or LDP. When a ZR controller receives a request for establishing a LSP tunnel from a user or an application, the ZR controller computes a path via a Constrained Shortest Path First (CSPF) algorithm, allocates a global ID for the LSP, and sends a LSP creation request to an egress node of the LSP. The LSP creation request may comprise path information (e.g., the global ID, the nodes along the path, and bandwidth reserved for the path) for creating the LSP along the path. When the egress node receives the LSP creation request from a ZR controller, the egress node allocates a local label, writes a forwarding entry according to the local label, and sends a second LSP creation request to a next upstream node along the path. The second LSP creation request may comprise updated path information, for example, the global ID, the local label, and a node sequence from the ingress node to the next upstream node. When a transit node of the LSP receives a LSP creation request comprising a first local label (e.g., Label_a) from a downstream node, the transit node allocates a second local label (e.g., Label_b), writes a forwarding entry according to Label_a and Label_b, and sends another LSP creation request comprising Label_b to a next upstream node of the transit node. When an ingress node of the LSP receives a LSP creation request comprising a local label from a downstream node, the ingress node writes a forwarding entry according to the received local label and sends a LSP creation response to the ZR controller indicating a state (e.g., created) of the LSP. When the ZR controller receives the LSP creation response, the ZR controller updates the state of the LSP according to the received LSP creation response. In an embodiment, the IGP or the BGP are extended to support ZR by adding additional TLVs to an OSPF opaque LSA. The disclosed embodiments are suitable for creating and/or deleting P2P LSPs and/or point-to-multipoint (P2MP) LSPs. When creating and/or deleting a P2MP LSPs the ZR controller may send a separate request to each egress node of the P2MP LSP.

Figure 3:
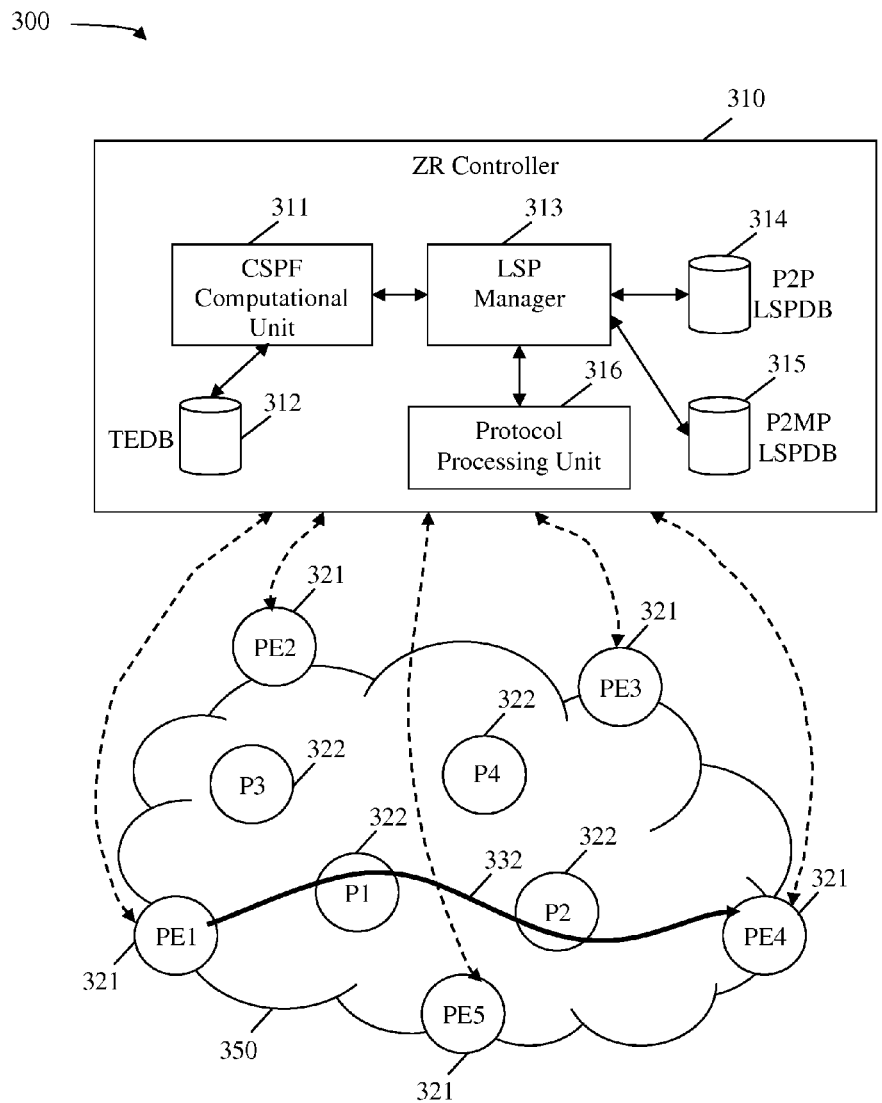
FIG. 3 is a schematic diagram of an embodiment of a zone routing (ZR) system.

FIG. 3 is a schematic diagram of an embodiment of a ZR system 300. The ZR system 300 comprises a ZR controller 310, a network zone 350 comprising a plurality of edge nodes 321 (e.g., PE1, PE2, PE3, PE4, and PE5) and a plurality of internal nodes 322 (e.g., P1, P2, P3, P4). The network zone 350 is managed and controlled by the ZR controller 310. The network zone 350 corresponds to a portion of a network, such as the network 230, where the edge nodes 321 and the internal nodes 322 may correspond to edge nodes, such as the edge nodes 221, and/or internal nodes, such as the internal nodes 222, of the network. The network zone 350 may be similar to the network zone 250 and the network 130, but the network zone 350 employs a ZR scheme that is more efficient than the SR scheme. The ZR controller 310 is in data communication with the edge nodes 321, as shown by the dashed arrows, but not with the internal nodes 322. The edge nodes 321 and the internal nodes 322 are in data communication with each other, for example, via links similar to the links 131.

The ZR controller 310 may be a VM, a hypervisor, or any other device configured to manage the network zone 350. The ZR controller 310 comprises a CSPF computational unit 311, a traffic engineering (TE) Database (TEDB) 312, a LSP manager 313, a P2P LSP database (LSPDB) 314, a P2MP LSPDB 315, and a protocol processing unit 316. The LSP manager 313 is coupled to the CSPF computational unit 311, the P2P LSPDB 314, the P2MP LSPDB 315, and the protocol processing unit 316. The CSPF computational unit 311 is further coupled to the TEDB 312.

The CSPF computational unit 311 may comprise hardware and/or software configured to compute routing paths through the network zone 350 based on some constraints. The CSPF computational unit 311 may employ a CSPF algorithm. The TEDB 312 is configured to store network resource information of the network zone 350. Some examples of network resource information may include bandwidths, delays, data rates, link types, statuses, and/or any other information associated with the network zone 350. For example, the CSPF computational unit 311 may consult with the TEDB 312 when performing path computations. In some embodiments, the CSPF computational unit 311 and the TEDB 312 may be located external to the ZR controller 310 and the TEDB 312 may be managed by a TEDB manager.

The P2P LSPDB 314 is configured to store global IDs and path information associated with P2P LSPs in the network zone 350. The P2MP LSPDB 315 is configured to store global IDs and path information associated with P2MP LSPs in the network zone 350. A LSP comprises a forwarding path through the network zone 350. A P2P LSP comprises a single ingress node and a single egress node in the network zone 350, whereas a P2MP LSP comprises a single ingress node and multiple egress nodes in the network zone 350. For example, the network zone 350 further comprises a LSP 332 that traverses from the edge node PE1 321 to the edge node PE4 321. Thus, the edge node PE1 321 is an ingress node of the LSP 332 and the edge node PE4 321 is an egress node of the LSP 332. The network zone 350 identifies each P2P LSP or each P2MP LSP by a unique global ID. In an embodiment, the P2P LSPDB 314 may comprise a first range of global IDs reserved for P2P LSP allocations and the P2MP LSPDB 315 may comprise a second range of global IDs reserved for P2MP LSP allocations, where the first range and the second range of global IDs are non-overlapping global IDs. When a global ID is allocated to a particular LSP (e.g., LSP 332), the path information may also be stored in the corresponding P2P LSPDB 314 or the P2MP LSPDB 315. The path information may include a node sequence for the LSP, a path state of the LSP, and network resources reserved for the LSP. For example, a node sequence for the LSP 332 may be stored in the form of {PE4→P2→P1→PE1} to indicate that the LSP 332 traverses from the edge node PE1 321, followed by the internal nodes P1 and P2 322, and to the edge node PE4 321. In some embodiments, the P2P LSPDB 314 and/or the P2MP LSPDB 315 may be located externally from the ZR controller 310 and may be managed by a LSPDB manager.

The protocol processing unit 316 may comprise hardware and/or software configured to communicate with the edge nodes 321. For example, the protocol processing unit 316 may implement an IGP or a BGP with extensions, as discussed more fully below.

The LSP manager 313 may comprise hardware and/or software configured to manage and control P2P LSPs (e.g., LSP 332) and P2M LSPs in the network zone 350. The LSP manager 313 coordinates with the CSPF computational unit 311 to compute paths through the network zone 350, for example, based on requests from users and/or applications. The LSP manager 313 obtains or allocates global IDs from the P2P LSPDB 314 for P2P LSPs. The LSP manager 313 obtains or allocates global IDs from the P2MP LSPDB 315 for P2MP LSPs. The LSP manager 313 communicates with the edge nodes 321 of the network zone 350 to create and/or delete LSPs via the protocol processing unit 316. To create and/or delete a LSP, such as the LSP 332, the LSP manager 313 sends a request to an egress node of the LSP and receives a response from an ingress node of the LSP. A LSP creation and/or deletion request may include a global ID of a LSP, a node sequence in the LSP, and/or other path information associated with the LSP. A LSP creation and/or deletion response may include a global ID of a LSP and a state of the LSP. It should be noted that when creating and/or deleting a P2MP LSP, the LSP manager 313 may send a LSP creation and/or deletion request to each egress node of the P2MP LSP. When LSPs are created and/or deleted in the network zone 350, the LSP manager 313 tracks and maintains global IDs, statuses, and/or states of the LSPs.

The edge nodes 321 and the internal nodes 322 may be switches, routers, bridges, and/or any other network devices suitable for forwarding data in the network zone 350. The edge nodes 321 are located at the edge or boundary of the network zone 350. The edge nodes 321 and the internal nodes 322 may be in data communication with each other. The edge nodes 321 are configured to communicate with the ZR controller 310. The internal nodes 322 are configured not to be in communication with the ZR controller 310. An edge node 321 may act as an egress node and/or an ingress node for one or more LSPs, such as the LSP 332. An internal node 322 may act as a transit node for one or more LSPs.

When an edge node 321 is an egress node of a LSP, such as the LSP 332, the edge node 321 receives LSP creation and/or deletion requests from the ZR controller 310. A LSP creation and/or deletion request comprises a global ID of a LSP and an ordered list of nodes from an ingress node of the LSP to an egress node of the LSP. Upon receiving a first LSP creation request, the edge node 321 allocates a local label, writes a forwarding entry according to the local label, and sends a second LSP creation request to a next upstream node (e.g., an internal node 322) along the LSP. The second LSP creation request may comprise the global ID, the local label, and a node sequence from the ingress node to the next upstream node.

When an internal node 322 is a transit node of a LSP, such as the LSP 332, the internal node 332 receives LSP creation and/or deletion requests from a next downstream node (e.g., an edge node 321 or an internal node 322) along the LSP. Upon receiving a first LSP creation request comprising a first local label (e.g., Label_a) from a downstream node, the internal node 322 allocates a second local label (e.g., Label_b), writes a forwarding entry according to Label_a and Label_b, and sends a second LSP creation request comprising Label_b to a next upstream node (e.g., an internal node 322 or an edge node 321) along the LSP.

When an edge node 321 is an ingress node of a LSP, such as the LSP 332, the edge node 321 receives LSP creation and/or deletion requests from a next downstream node (e.g., an internal node 322) along the LSP. Upon receiving a LSP creation request comprising a local label from a downstream node, the edge node 321 writes a forwarding entry according to the received local label and sends a LSP creation response to the ZR controller 310 indicating a state (e.g., created) of the LSP. It should be noted that the controller-edge node interactions in a LSP deletion process are substantially similar to the LSP creation process, as discussed more fully below.

Figure 4:
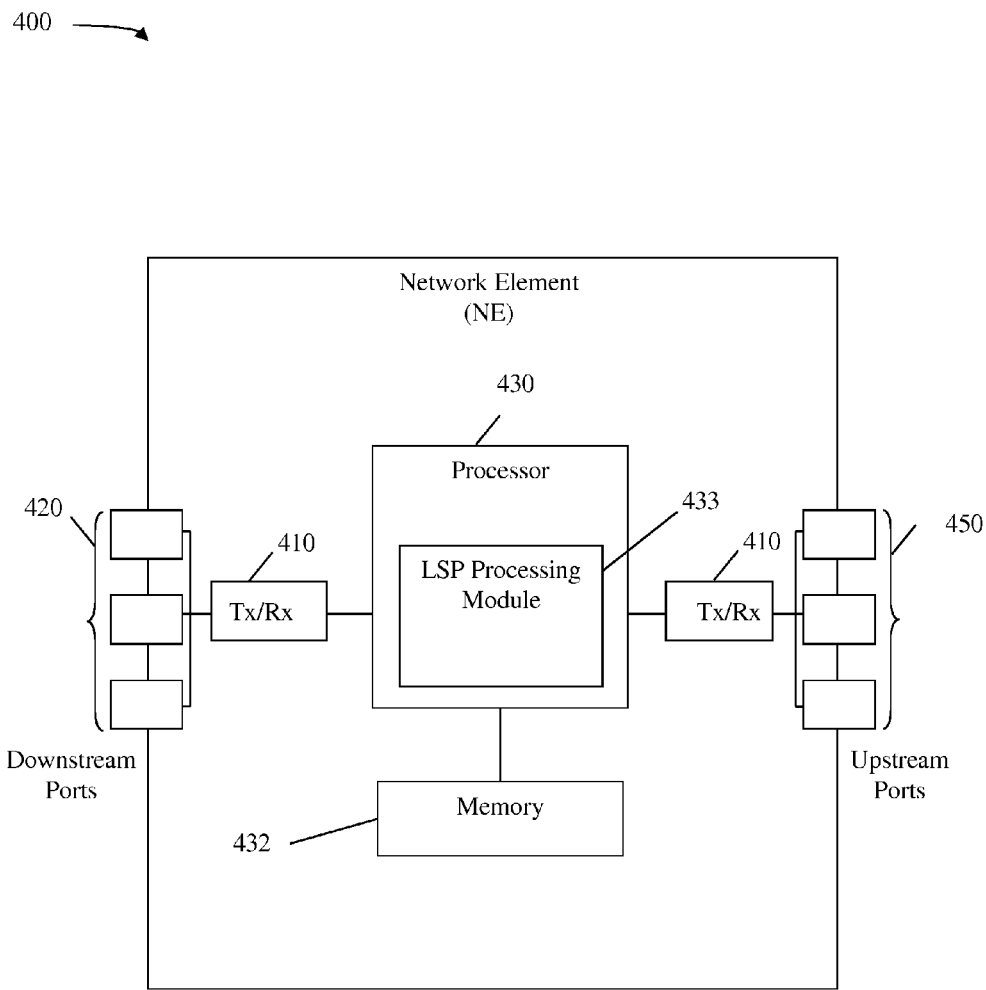
FIG. 4 is a schematic diagram of an embodiment of a network element (NE), which may act as a node in a ZR system.

FIG. 4 is a schematic diagram of an embodiment of an NE 400, which may act as a node in a ZR system, such as the systems 200 and 300. For instance, the NE 400 may be a ZR controller, such as the ZR controller 310, an edge node, such as the edge node 321, or an internal node, such as the internal node 322. NE 400 may be configured to implement and/or support the LSP creations and deletions mechanisms described herein. NE 400 may be implemented in a single node or the functionality of NE 400 may be implemented in a plurality of nodes. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 400. For instance, the features and/or methods in the disclosure may be implemented using hardware, firmware, and/or software installed to run on hardware.

As shown in FIG. 4, the NE 400 may comprise transceivers (Tx/Rx) 410, which may be transmitters, receivers, or combinations thereof. A Tx/Rx 410 may be coupled to plurality of downstream ports 420 for transmitting and/or receiving frames from other nodes and a Tx/Rx 410 may be coupled to plurality of upstream ports 450 for transmitting and/or receiving frames from other nodes, respectively. A processor 430 may be coupled to each Tx/Rx 410 to process the frames and/or determine which nodes to send the frames to. The processor 430 may comprise one or more multi-core processors and/or memory devices 432, which may function as data stores, buffers, etc. The processor 430 may be implemented as a general processor or may be part of one or more application specific integrated circuits (ASICs) and/or digital signal processors (DSPs).

The processor 430 may comprise a LSP processing module 433, which may perform processing functions of a ZR controller, an edge node, or an internal node and implement methods 500, 600, 700, 800, 900, 1000, 1100, and 1200 as discussed more fully below, and/or any other method discussed herein. As such, the inclusion of the LSP processing module 433 and associated methods and systems provide improvements to the functionality of the NE 400. Further, the LSP processing module 433 effects a transformation of a particular article (e.g., the network) to a different state. In an alternative embodiment, the LSP processing module 433 may be implemented as instructions stored in the memory devices 432, which may be executed by the processor 430. The memory device 432 may comprise a cache for temporarily storing content, e.g., a random-access memory (RAM). Additionally, the memory device 432 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 432 may be configured to store one or more network DBs, such as the TEDB 312, the P2P LSPDB 314, and/or the P2MP LSPDB 315.

It is understood that by programming and/or loading executable instructions onto the NE 400, at least one of the processor 430 and/or memory device 432 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
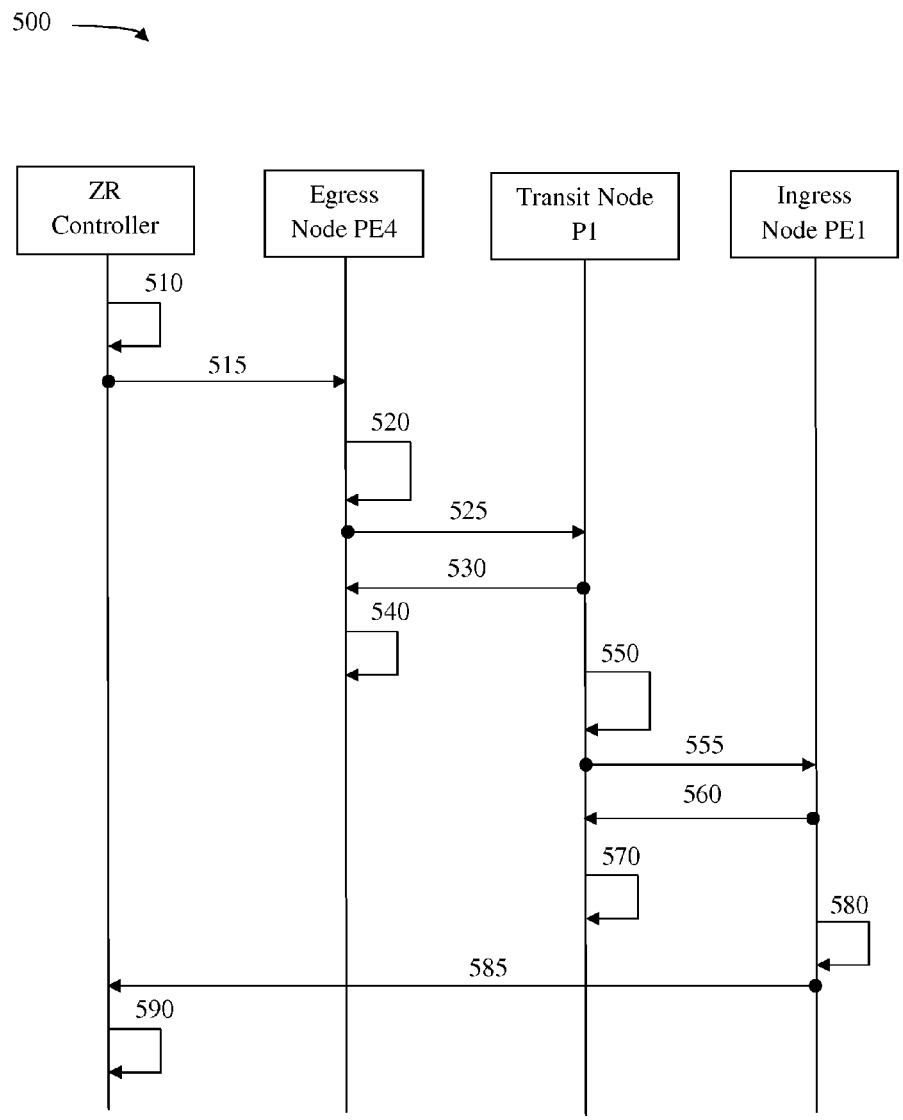
FIG. 5 is a protocol diagram of an embodiment of a method for creating a point-to-point (P2P) label-switched path (LSP).

FIG. 5 is a protocol diagram of an embodiment of method 500 for creating a P2P LSP, such as the LSP 332. The method 500 is implemented between a ZR controller, such as the ZR controller 310, an egress node PE4, such as the edge nodes 321, a transit node P1, such as the internal nodes 322, and an ingress node PE1, such as the edge nodes 321. The method 500 is implemented when the ZR controller receives a LSP request from a user or an application. For example, the user or the application requests a LSP for forwarding a data flow or a traffic class, which may be represented as an FEC or an interface index. At step 510, the ZR controller obtains a path, where the path traverses from the ingress node PE1 to the egress node PE4 through the transit node P1 (e.g., {PE4→P1→PE1}). For example, the path is computed by a CSPF computational unit, such as the CSPF computational unit 311. After obtaining the path, the ZR controller obtains a global ID (e.g., LSP-ID) for a LSP along the path. For example, the global ID is allocated from a P2P LSPDB, such as the P2P LSPDB 314. At step 515, the ZR controller sends a first request to the egress node PE4 of the LSP along the path to create the LSP. The first request may include the global ID, LSP-ID, and a node sequence, {PE4→P1→PE1}, for the LSP along the path. In addition, the first request may include the ZR controller address and the traffic class for the LSP.

At step 520, upon receiving the first request, the egress node PE4 allocates a local label (e.g., L4), records L4 under LSP-ID, and creates an FIB entry (e.g., (L4, pop)) to facilitate subsequent packet forwarding along the LSP. The FIB entry may be stored in local memory, such as the memory device 432. For example, when the egress node PE4 receives a packet, the egress node PE4 determines a forwarding port according to the FIB. When the packet is attached with a label L4, the egress node PE4 removes the label L4 and forwards the packet to the destination of the packet. At step 525, the egress node PE4 sends a second request to the transit node P1 (e.g., a next upstream node along the path) requesting creation of the LSP. The second request may include L4, LSP-ID, the traffic class, and remaining hops in the path (e.g., {P1→PE1}). The egress node PE4 may store the second request in the memory until the transit node P1 acknowledges the reception of the second request.

At step 530, upon receiving the second request from the egress node PE4, the transit node P1 sends a first acknowledgement to the egress node PE4 to acknowledge the reception of the second request. At step 540, upon receiving the first acknowledgement from the transit node P1, the egress node PE4 may flush the second request from the memory. At step 550, in response to the second request, the transit node P1 allocates a local label (e.g., L1), records L1 under LSP-ID, and creates an FIB entry (e.g., (L1, L4)) to facilitate subsequent packet forwarding to the egress node PE4. For example, when the transit node P1 receives a packet with a label L1, the transit node P1 removes the label L1, attaches a label L4 to the packet, and forwards the packet to the egress node PE4. At step 555, the transit node P1 sends a third request to the ingress node PE1 (e.g., a next upstream node along the path) requesting creation of the LSP. The third request may include L1, LSP-ID, the traffic class, and remaining hops in the path (e.g., {PE1}). Similarly, the transit node P1 may store the third request in local memory until the ingress node PE1 acknowledges the reception of the third request.

At step 560, upon receiving the third request from the transit node P1, the ingress node PE1 sends a second acknowledgement to the transit node P1 to acknowledge the reception of the third request. At step 570, upon receiving the second acknowledgement from the ingress node PE1, the transit node P1 may flush the third request from the memory. At step 580, in response to the third request, the ingress node PE1 creates an FIB entry (e.g., traffic class, push L1) to facilitate subsequent packet forwarding to the transit node P1. For example, when the ingress node PE1 receives a packet corresponding to the traffic class, the ingress node PE1 pushes or attaches the label L1 to the packet and forwards the packet to the transit node P1. At step 585, the ingress node PE1 sends a response to the ZR controller. The response may include the global ID and a creation status of the LSP. At step 590, upon receiving the response, the ZR controller may update the P2P LSPDB according to the received response. It should be noted that in some embodiments, a LSP may comprise multiple transit nodes between an egress node and an ingress node. In such embodiments, each transit node may perform similar operations as the transit node P1 upon receiving a LSP creation request from a downstream node along a path. In addition, a P2MP LSP may be created by employing similar mechanisms as shown in method 500. However, the ZR controller may send a LSP creation request to each egress node (e.g., destination node) of the P2MP LSP. Further, the first and the second acknowledgements at steps 530 and 560 and/or the flushing of the second and third requests at steps 540 and 570 may be optional in some embodiments.

Figure 6:
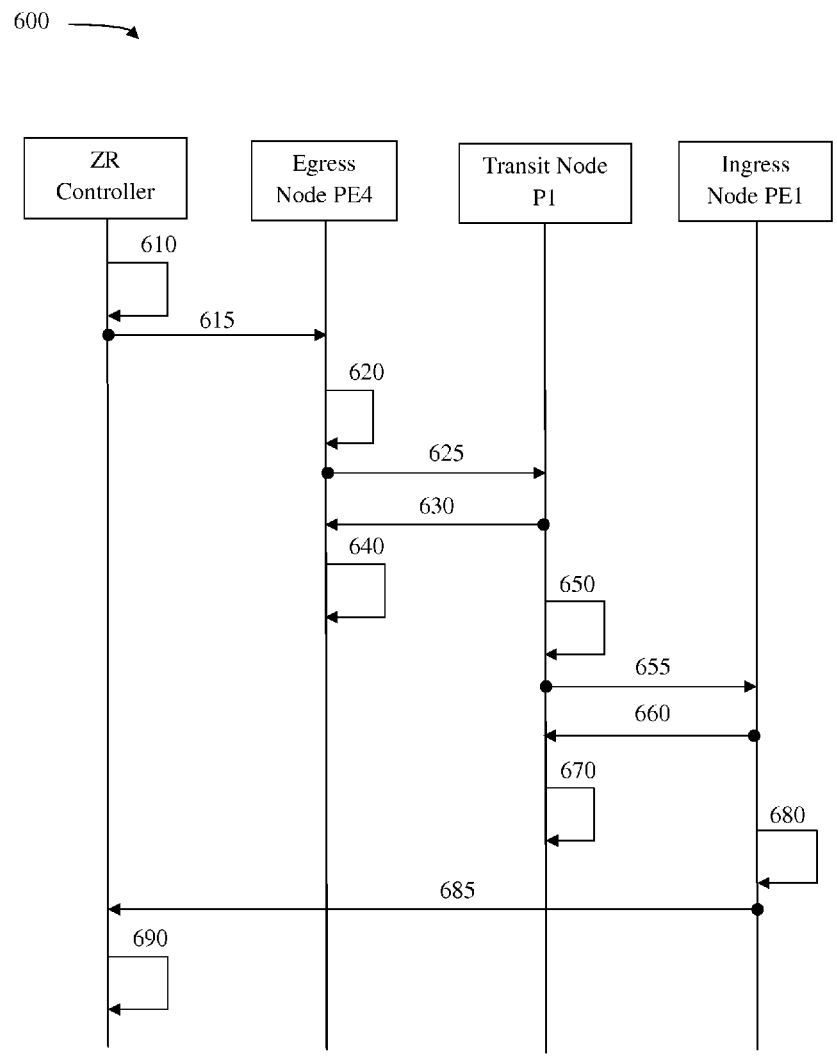
FIG. 6 is a protocol diagram of an embodiment of a method for deleting a P2P LSP.

FIG. 6 is a protocol diagram of an embodiment of a method 600 for deleting a P2P LSP, such as the LSP 332. The method 600 is implemented between a ZR controller, such as the ZR controller 310, an egress node PE4, such as the edge nodes 321, a transit node P1, such as the internal nodes 322, and an ingress node PE1, such as the edge nodes 321. The method 600 is implemented after a LSP is created, for example, by employing the method 500. For example, a LSP identified by a global ID (e.g., LSP-ID), is created, where the LSP traverses from the ingress node PE1 to the egress node PE4 through the transit node P1 (e.g., {PE4→P1→PE1}). The egress node PE1 comprises an FIB entry, (L4, pop), for data forwarding along the LSP, where L4 is a local label allocated by the egress node PE4 and recorded under LSP-ID. The transit node P1 comprises an FIB entry, (L1, L4), for data forwarding along the LSP, where L1 is a local label allocated by the transit node P1 and recorded under LSP-ID. The ingress node PE1 comprises an FIB entry, (traffic class, push L1), for data forwarding along the LSP. Each of the egress node PE4, the transit node P1, and the ingress node PE1 may store the FIB entry, the global ID, and/or the local label in local memory, such as the memory device 432.

At step 610, the ZR controller determines to delete the LSP, for example, based on a user request or an application request. At step 615, the ZR controller sends a first request to the egress node PE4 to delete the LSP. The first request may include the global ID, LSP-ID, a node sequence, {PE4→P1→PE1}, for the LSP, and the ZR controller address.

At step 620, upon receiving the first request, the egress node PE4 releases L4 recorded under LSP-ID and removes the FIB entry, (L4, pop). At step 625, the egress node PE4 sends a second request to the transit node P1 (e.g., a next upstream node along the LSP) requesting deletion of the LSP. The second request may include L4, LSP-ID, and the remaining hops in the LSP (e.g., {P1→PE1}). The egress node PE4 may store the second request in the local memory until the transit node P1 acknowledges the reception of the second request.

At step 630, upon receiving the second request from the egress node PE4, the transit node P1 sends a first acknowledgement to the egress node PE4 to acknowledge the reception of the second request. At step 640, upon receiving the first acknowledgement from the transit node P1, the egress node PE4 may flush the second request from the local memory. At step 650, in response to the second request, the transit node P1 releases L1 recorded under LSP-ID and removes the FIB entry, (L1, L4). At step 655, the transit node P1 sends a third request to the ingress node PE1 (e.g., a next upstream node along the LSP) requesting deletion of the LSP. The third request may include L1, LSP-ID, and the remaining hop in the LSP (e.g., {PE1}). Similarly, the transit node P1 may store the third request in the local memory until the ingress node PE1 acknowledges the reception of the third request.

At step 660, upon receiving the third request from the transit node P1, the ingress node PE1 sends a second acknowledgement to the transit node P1 to acknowledge the reception of the third request. At step 670, upon receiving the second acknowledgement from the ingress node PE1, the transit node P1 may flush the third request from the local memory. At step 680, in response to the third request, the ingress node deletes the FIB entry, (traffic, push L1), corresponding to the LSP-ID. At step 685, the ingress node PE1 sends a response to the ZR controller. The response may include the global ID and a deletion status of the LSP. At step 690, upon receiving the response, the ZR controller may update the P2P LSPDB according to the received response, for example, release the LSP-ID back to the P2P LSPDB and delete associated path information. It should be noted that in some embodiments, a LSP may comprise multiple transit nodes between an egress node and an ingress node. In such embodiments, each transit node may perform similar operations as the transit node P1 upon receiving a LSP deletion request from a downstream node. In addition, a P2MP LSP may be deleted by employing similar mechanisms as shown in method 600. However, the ZR controller may send a LSP deletion request to each egress node (e.g., destination node) of the P2MP LSP.

Figure 7:
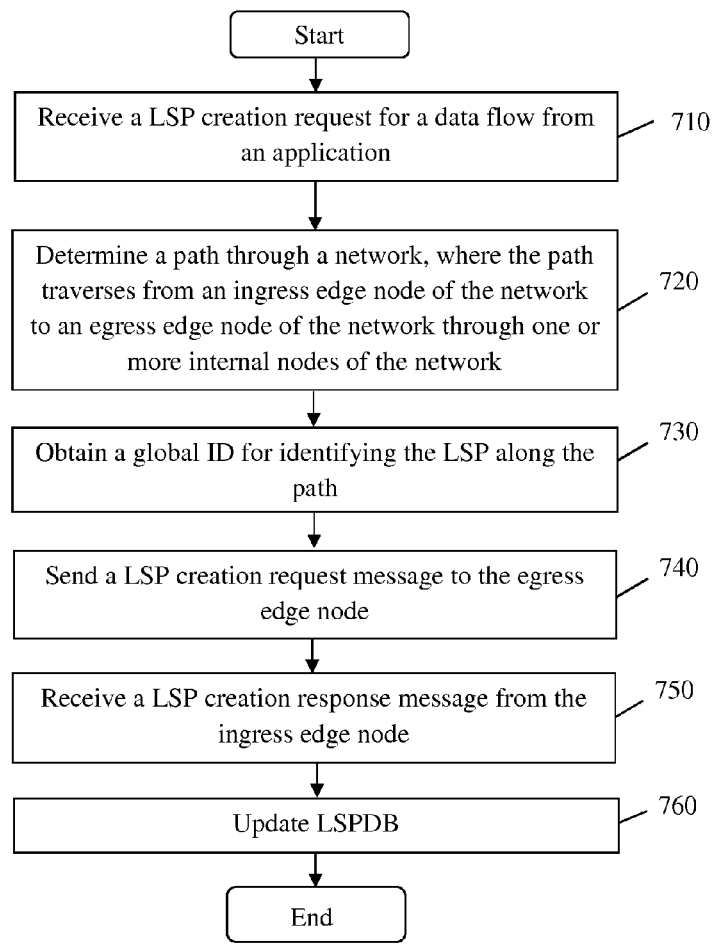
FIG. 7 is a flowchart of an embodiment of a method for creating a LSP.

FIG. 7 is a flowchart of an embodiment of a method 700 for creating a LSP, such as the LSP 332. The method 700 is implemented by a network controller, such as the ZR controller 310, in a network, such as the network zone 350. The network may comprise a plurality of edge nodes, such as the edge nodes 221 and 321, and a plurality of internal nodes, such as the internal nodes 222 and 322. The method 700 may employ similar mechanisms as described in the methods 500 and 600. The method 700 begins at step 710 when a LSP creation request for a data flow is received, for example, from a user or an application that employs the network for data forwarding. The data flow may be identified by a traffic class, which may be identified by a FEC or an interface index. In an embodiment, the traffic class may specify a source, such as the source 150, and/or a destination, such as the destination 160, of the data flow.

At step 720, a path through the network is determined. The path may be determined by requesting a CSPF engine, such as the CSPF computational unit 311, to compute a path for the data flow. For example, the source of the data flow may be connected to an ingress edge node (e.g., PE1) of the network and the destination of the data flow may be connected to an egress edge node (e.g., PE4) of the network. Thus, the CPSF engine may compute a shortest constrained path from the ingress edge node to the egress edge node according to a CSPF algorithm. The CSPF engine may consult with a TEDB, such as the TEDB 312, when computing the path. The CSPF engine may reserve bandwidths for the LSP along the path from the TEDB. The path may traverse one or more of the internal nodes (e.g., P1, and P2) of the network.

At step 730, a global ID is obtained for the LSP along the path, for example, by coordinating with a LSPDB manager. In an embodiment, the global ID is allocated from a P2P LSPDB, such as the P2P LSPDB 314, when the LSP is a P2P LSP. In another embodiment, the global ID is allocated from a P2MP LSPDB such as the P2MP LSPDB 315, when the LSP is a P2MP LSP.

At step 740, a LSP creation request message is sent to the egress edge node. The LSP creation request message may comprise the global ID, the traffic class that describes the data flow, the network controller address (e.g., an IP address), and path information indicating a node sequence (e.g., {PE4→P2→P1→PE1}) for the path from the ingress edge node to the egress edge node. The path information may also include a bandwidth reserved for each of the links, such as the link 131, along the path. At step 750, a LSP creation response message is received from the ingress edge node indicating a creation status of the LSP in response to the LSP creation request message sent at step 740. At step 760, the LSPDB may be updated according to the LSP creation response message. For example, the LSPDB may store an entry for the global ID, which may include the global ID, path information (e.g., bandwidths and the node sequence), and a state of the LSP. It should be noted that the method 700 is suitable for creating a P2P LSP or a P2MP LSP. When creating a P2MP LSP, the path obtained at step 720 is for a P2MP LSP and the steps of 740-760 may be repeated by sending a LSP creation request message to each egress nodes of the P2MP LSP.

Figure 8:
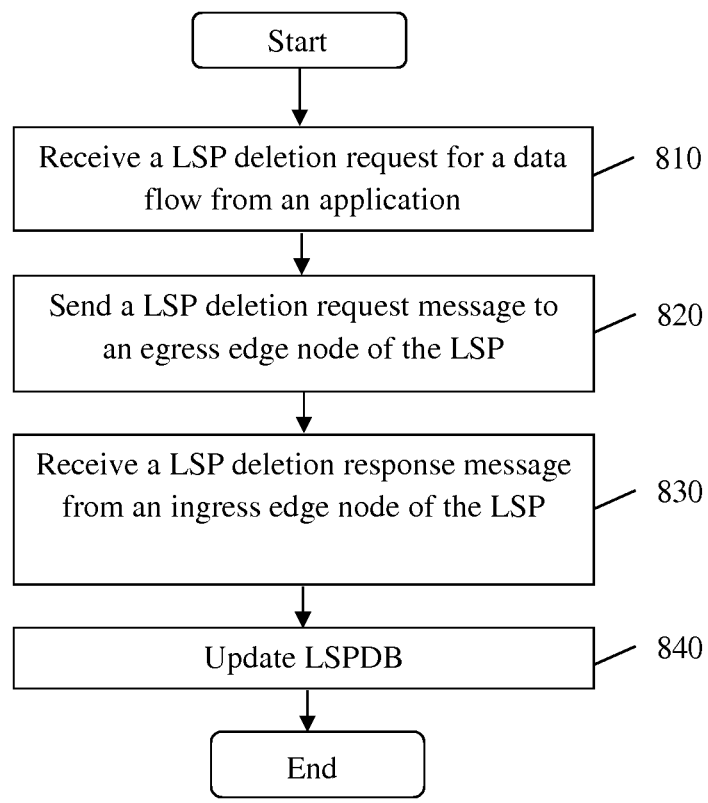
FIG. 8 is a flowchart of an embodiment of a method for deleting a LSP.

FIG. 8 is a flowchart of an embodiment of a method 800 for deleting a LSP, such as the LSP 332. The method 800 is implemented by a network controller, such as the ZR controller 310, in a network, such as the network zone 350. The network may comprise a plurality of edge nodes, such as the edge nodes 221 and 321, and a plurality of internal nodes, such as the internal nodes 222 and 322. The method 800 may employ similar mechanisms as described in the methods 500 and 600. The method 800 is implemented after a LSP is created for a data flow, for example, by employing similar mechanisms as described in the methods 500, 600, and 700. For example, a global ID is allocated to the LSP, where the global ID and a list of nodes along the LSP are stored in a LSPDB, such as the LSPDBs 314 and 315. At step 810, a LSP deletion request for the data flow is received, for example, from a user or an application. At step 820, upon receiving a LSP deletion request for the data flow, a LSP deletion request message is sent to an egress edge node of the LSP requesting deletion of the LSP. The LSP deletion request message may comprise the global ID of the LSP, the list of nodes in the LSP, and the network controller address. At step 830, a LSP deletion response message is received from an ingress edge node of the LSP indicating a deletion status of the LSP in response to the LSP deletion request message sent at step 820. At step 840, the LSPDB may be updated according to the LSP deletion response message. For example, the global ID may be released and returned to the LSPDB and information associated with the global ID may be deleted from the LSPDB. It should be noted that the method 800 is suitable for deleting a P2P LSP or a P2MP LSP. When deleting a P2MP LSP, the steps of 820-840 may be repeated by sending a LSP deletion request message to each egress nodes of the P2MP LSP.

Figure 9:
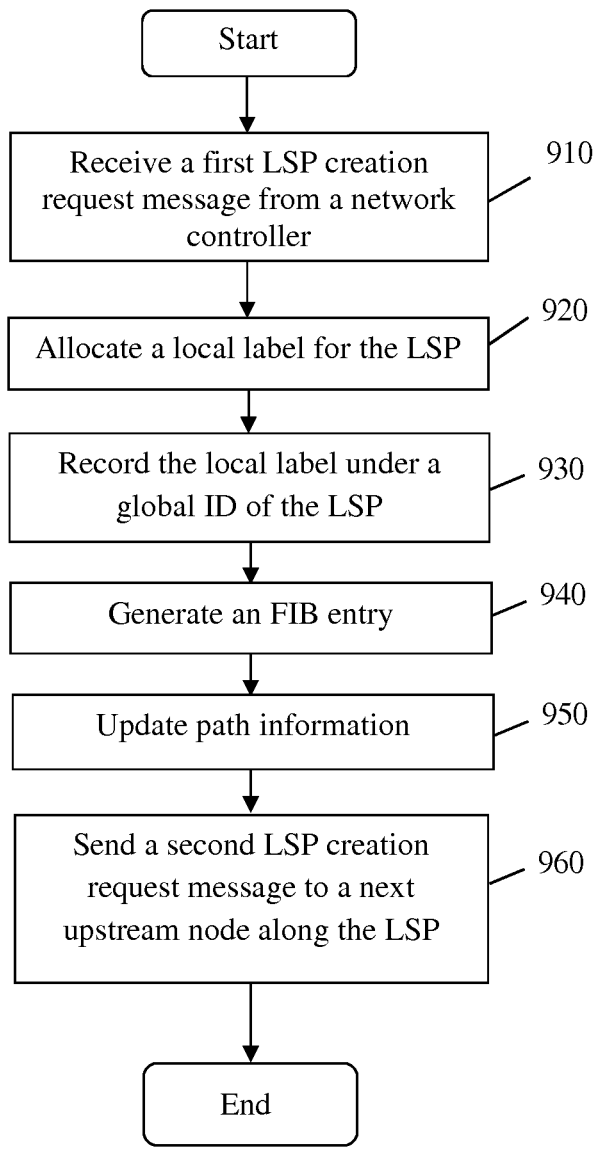
FIG. 9 is a flowchart of another embodiment of a method for creating a LSP.

FIG. 9 is a flowchart of another embodiment of a method 900 for creating a LSP, such as the LSP 332. The method 900 is implemented by an egress node, such as the edge node PE4 322 in the network zone 350, of a LSP. The LSP may be a P2P LSP or a P2MP LSP. The network may comprise a plurality of edge nodes, such as the edge nodes 221 and 321, and a plurality of internal nodes, such as the internal nodes 222 and 322. The method 900 may employ similar mechanisms as described in the methods 500 and 600. The method 900 begins at step 910 when a first LSP creation request message is received from a network controller, such as the ZR controller 310, requesting creation of a LSP. The first LSP creation request message may comprise a global ID (e.g., LSP-ID) for the LSP, a traffic class that may be forwarded along the LSP, the network controller address (e.g., an IP address), and path information for the LSP. For example, the path may be represented in the form of an ordered list {PE4→P2→P1→PE1}, where PE4 corresponds to the egress node, PE1 is an ingress node of the LSP, and P1 and P2 are transit nodes along the LSP. At step 920, a local label (e.g., L4) is allocated for the LSP, for example, from a local pool of labels maintained by the egress node. At step 930, the local label is recorded under the global ID. At step 940, an FIB entry is generated for the LSP. The FIB entry may comprise a match condition and an action. For example, the FIB entry may be in the form of (L4, pop), which instructs the egress node to perform a label pop action (e.g., label removal) when receiving a packet with a label L4. At step 950, the path information is updated, for example, by removing PE4 from the node list of the path (e.g., {P2→P1→PE1}). At step 960, a second LSP creation request message is sent to a next upstream node (e.g., P2) along the LSP. The second LSP creation request message comprises the global ID, the local label, the traffic class, and the updated path information (e.g., {P2→P1→PE1}).

Figure 10:
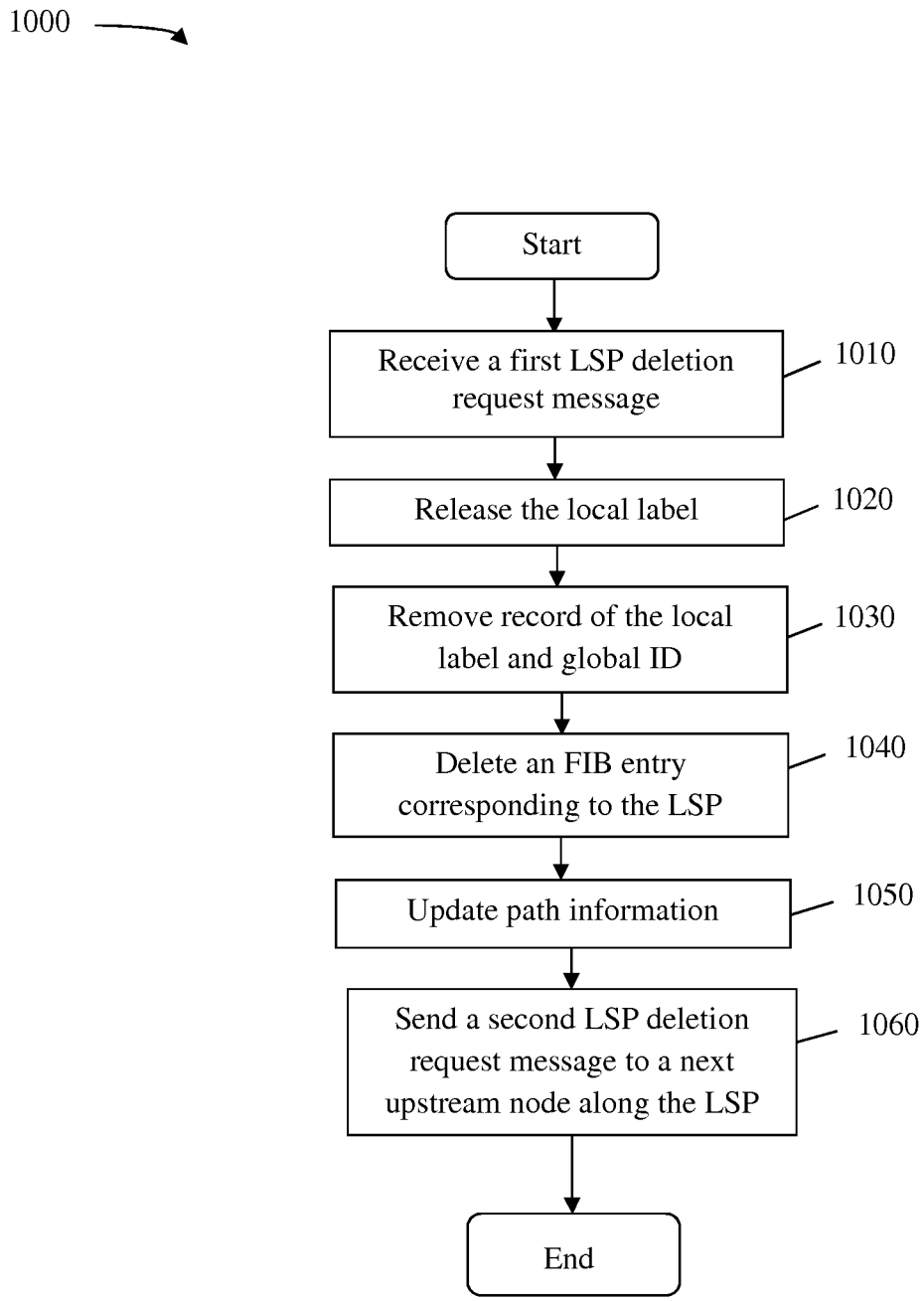
FIG. 10 is a flowchart of another embodiment of a method for deleting a LSP.

FIG. 10 is a flowchart of another embodiment of a method 1000 for deleting a LSP, such as the LSP 332. The method 1000 is implemented by an egress node, such as the edge node PE4 322 in the network zone 350, of a LSP. The LSP may be a P2P LSP or a P2MP LSP. The network may comprise a plurality of edge nodes, such as the edge nodes 221 and 321, and a plurality of internal nodes, such as the internal nodes 222 and 322. The method 1000 may employ similar mechanisms as described in the methods 500 and 600. The method 1000 is implemented after a LSP is created, for example, by employing similar mechanisms as described in the methods 500, 600, and 900. For example, the LSP identified by a global ID, a local label is allocated from a local pool to the LSP, and an FIB entry is created for the LSP. At step 1010, a first LSP deletion request message is received from the network controller. The first path deletion request message may comprise a global ID (e.g., LSP-ID) of the LSP, a list of nodes in the LSP (e.g., {PE4→P2→P1→PE1}), and a network controller address. At step 1020, the local label for the LSP is released. For example, the egress node may look up the local label that is previously recorded under the global ID and return the local label to the local pool. At step 1030, the record for the global ID and the local label is removed. At step 1040, the FIB entry corresponding to the LSP (e.g., associated with the local label) is deleted. At step 1050, the path information is updated (e.g., {P2→P1→PE1}). At step 1060, a second LSP deletion request message is sent to a next upstream node (e.g., P2) along the LSP. The second LSP deletion request message comprises the global ID, the local label, and the updated path information.

Figure 11:
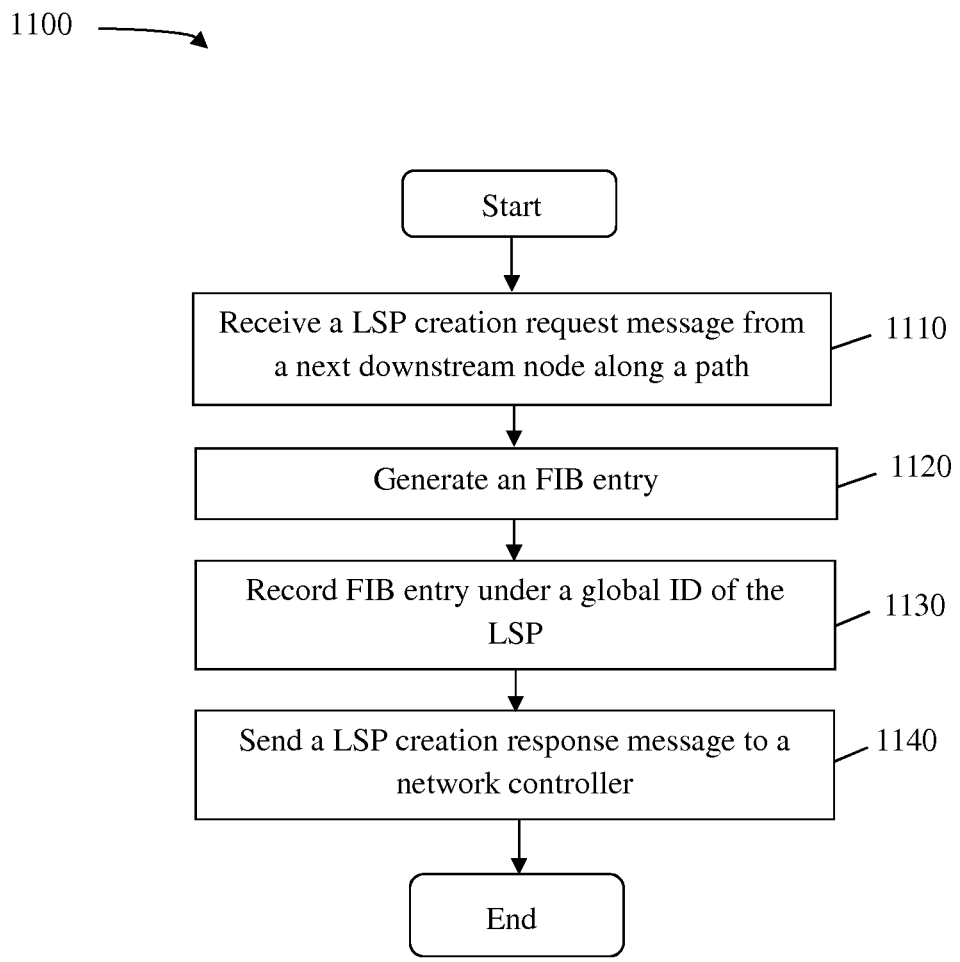
FIG. 11 is a flowchart of another embodiment of a method for creating a LSP.

FIG. 11 is a flowchart of another embodiment of a method 1100 for creating a LSP, such as the LSP 332. The method 1100 is implemented by an ingress node, such as the edge node PE1 322 in the network zone 350, of a LSP. The LSP may be a P2P LSP or a P2MP LSP. The network may comprise a plurality of edge nodes, such as the edge nodes 221 and 321, and a plurality of internal nodes, such as the internal nodes 222 and 322. The method 1100 may employ similar mechanisms as described in the methods 500 and 600. The method 1100 begins at step 1110 when a LSP creation request message is received from a next downstream node along a LSP. For example, the creation of the LSP is initiated by a network controller, such as the ZR network controller 110, and the LSP traverses from a first of the plurality of edge nodes (e.g., PE1) to a second of the plurality of edge nodes (e.g., PE4) through two internal nodes (e.g., P1 followed by P2). Thus, the next downstream node may correspond to P1. The first LSP creation request message may comprise a global ID (e.g., LSP-ID) for the LSP, a local label (e.g., L1), a traffic class (e.g., FEC or an interface index) that may be forwarded along the LSP, the network controller address (e.g., an IP address), and path information (e.g., {PE1}). At step 1120, an FIB entry is generated according to the traffic class and the local label.

The FIB entry may comprise a match condition and an action. For example, the FIB entry may be in the form of (FEC/interface index, push L1), which instructs the ingress node to perform a label push action (e.g., add label L1) when receiving a packet corresponding to the traffic class indicated by FEC or the interface index. At step 1130, the FIB entry is recorded under the global ID of the LSP. At step 1140, a LSP creation response message is sent to the network controller. For example, the LSP creation responds message may comprise a creation status of the LSP and the global ID of the LSP.

Figure 12:
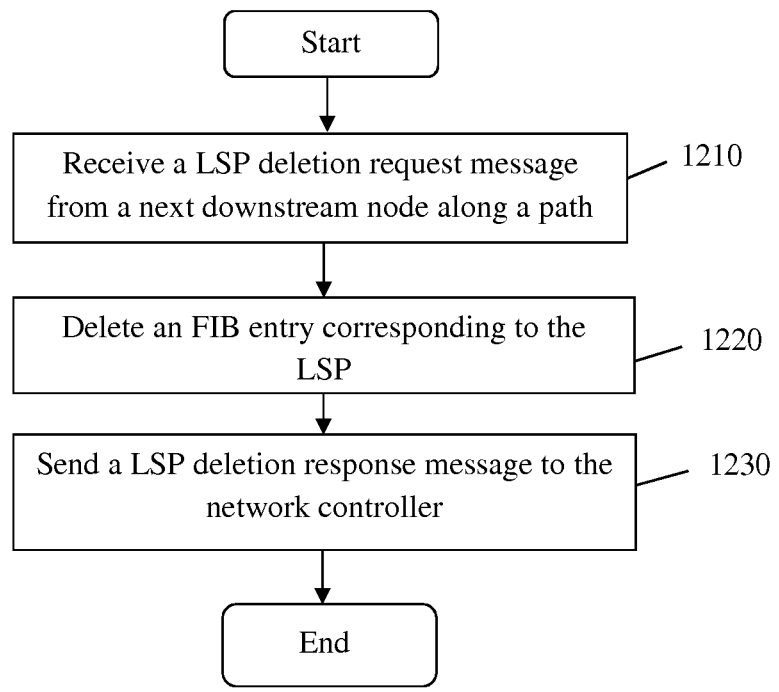
FIG. 12 is a flowchart of another embodiment of a method for deleting a LSP.

FIG. 12 is a flowchart of another embodiment of a method 1200 for deleting a LSP, such as the LSP 332. The method 1200 is implemented by an ingress node, such as the edge node PE1 322 in the network zone 350, of a LSP. The LSP may be a P2P LSP or a P2MP LSP. The network may comprise a plurality of edge nodes, such as the edge nodes 221 and 321, and a plurality of internal nodes, such as the internal nodes 222 and 322. The method 1200 may employ similar mechanisms as described in the methods 500 and 600. The method 1200 is implemented after a LSP (e.g., {PE4→P2→P1→PE1}) is created, for example, by employing similar mechanisms as described the methods 500, 600, and 1100. For example, the LSP is identified by a global ID and an FIB entry is created for the LSP. At step 1210, a LSP deletion request message is received from a next downstream node along the LSP. The LSP deletion request message may comprise the global ID (e.g., LSP-ID) of the LSP, path information (e.g., {PE1}), and the network controller address. At step 1220, an FIB entry corresponding to the LSP is deleted. For example, the FIB entry may be found by looking up a record that stores the FIB entry under the global ID. At step 1230, a LSP deletion response message is sent to the network controller. The LSP deletion response message may comprise a deletion status of the LSP and the global ID of the LSP.

In contrast to an SR scheme, the disclosed ZR scheme simplifies the controller-node interactions by enabling a ZR controller, such as the controller 310, to communicate with edge nodes, such as the edge nodes 221 and 321, of a network zone, such as the network zones 250 and 350, but not with all internal nodes, such as the internal nodes 222 and 322, in the network zone. In the ZR scheme, a single local label may be attached to a packet to indicate a next hop instead of a stack of labels. Thus, a network or a portion of a network may be easily migrated to employ ZR scheme without any hardware upgrades, service interruptions, and/or significant network architecture changes. The following table lists comparisons between SR and ZR:

TABLE 1

Comparisons between SR and ZR

|  | SR | ZR |
| --- | --- | --- |
| Source Routing | Yes | No |
| Some Hardware Devices Upgrade | Yes | No |
| Extra Data Packet Overhead | Large | Minimal |
| Multicast Support | No | Yes |
| Network Scalability | Limited | High Scalability |
| Migration | Difficult | Simple |
| Service Interruption During Migration | Yes | No |
| Controller Design | Complex | Simple |
| Change to Existing Network Architecture | Significant | Minimal |

In contrast to a network, such as an MPLS network, that employs a path computation element (PCE), the disclosed ZR scheme simplifies the routing process without the employment of RSVP with TE extensions (RSVP-TE) at every node, such as the edge nodes 321 and the internal nodes 322, in a network, such as the network zone 350. For example, the network nodes are not required to maintain soft states for LSPs in the network and LSPs may be set up and/or tear down by employing an IGP instead of a RSVP-TE protocol. In addition, a LSP creation and/or deletion is sent to an egress node of a LSP instead of an ingress of the LSP. Further, a LSP is identified by a single global ID instead of a source, a destination, a tunnel ID, and an extended tunnel ID. Thus, a network that employs ZR may provide better scalability than a network that employs a PCE. The following lists comparisons between a network that employs a PCE and a network that employs ZR:

TABLE 2

Comparisons between PCE and ZR

|  | PCE | ZR |
| --- | --- | --- |
| Requires every node in a network to run RSVP-TE | Yes | No |
| Every node along a LSP needs to maintain the soft state for the LSP | Yes | No |
| Path for a LSP is sent to | Ingress of LSP | Egress of LSP |
| LSP is identified by | <src, dst, tunnel-ID, . . .> | Global ID |
| LSP is set up by | RSVP-TE | IGP |
| Network Scalability | Limited | High Scalability |

In contrast to a network that employs an SDN controller or an extended PCE (PCE+), the disclosed ZR scheme simplifies ZR controller design and the LSP creation and/or deletion process. In the ZR scheme, a ZR controller, such as the ZR controller 310, only manages and allocates global IDs for LSPs, such as the LSP 332, in a network, such as the network zone 350, but does not manage label resources for every segment and/or tunnel in the network zone. The ZR controller communicates with edge nodes, such as the edge nodes 221 and 321, but not with internal nodes, such as the internal nodes 222 and 322, along the LSP. For example, the ZR controller does not write and/or delete cross connects on every node along a LSP or a tunnel in the network zone. The ZR scheme may be employed without an RSVP-TE and the connections are stateless. Thus, a network that employs ZR may provide better scalability than a network that employs a PCE+ or an SDN controller. The following lists comparisons between a network that employs a PCE+ or an SDN controller and a network that employs ZR:

TABLE 3

Comparisons between PCE+/SDN Controller and ZR

|  | PCE+/SDN Controller | ZR |
| --- | --- | --- |
| Controller manages label resource including allocating labels for a tunnel | Yes | No |
| Controller connects to every node in a network | Yes | Only edges of network |
| Controller writes/deletes cross connect on every node along a tunnel | Yes | No |
| Network Scalability | Limited | High scalability |
| Controller Complexity | Complex | Simple |
| Change to Existing Network | Significant | Minimal |

Figure 13:
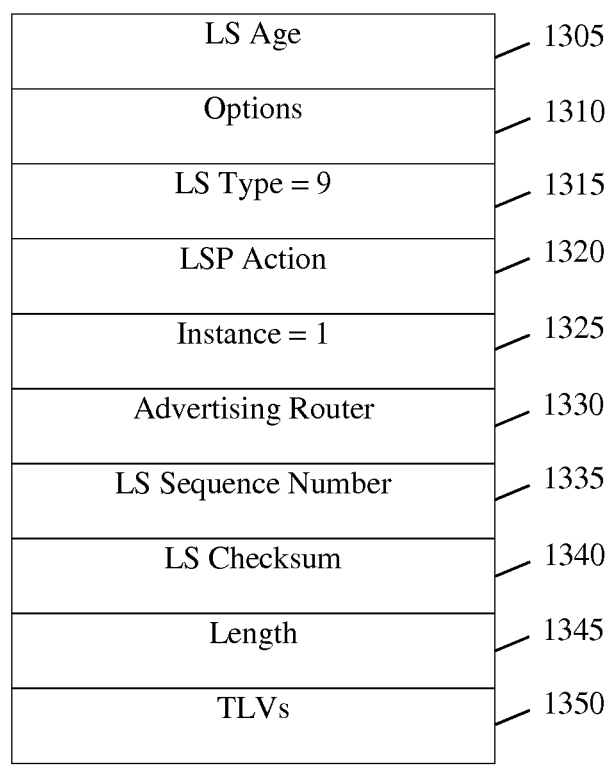
FIG. 13 is a schematic diagram illustrating an embodiment of an Open Shortest Path First (OSPF) opaque Link-State Advertisement (LSA) packet.

FIG. 13 is a schematic diagram of an embodiment of an OSPF opaque LSA 1300. The LSA 1300 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. For example, the LSA 1300 may be configured as part of a LSP creation request message, a LSP creation response message, a LSP deletion request message, or a LSP deletion response message, as described more fully below. The LSA 1300 comprises a link state (LS) age field 1305, an options field 1310, a LSA type field 1315, a LSP action field 1320, an instance field 1325, an advertising router field 1330, a LS sequence number field 1335, a LS checksum field 1340, a length field 1345, and TLVs 1350. The LS age field 1305 is about two octets long and indicates the time in seconds since the LSA 1300 was originated. The options field 1310 is about one octet long and indicates the optional capabilities supported by a routing domain. The LSA type field 1315 is about one octet long and may indicate the format and function of LSA 1300. For example, the LSA type field 1315 is to a value of nine to indicate that the LS 1300 is a link-local opaque LSA. The LSP action field 1320 is about one octet long and indicates whether a LSP action is a LSP creation or a LSP deletion. The instance field 1325 is about three octets long and indicates an instance number of the LSA 1300. For example, the instance field 1325 is set to a value of one to indicate a first instance of the LSA 1300. The advertising router field 1330 is about four octets long and indicates a router ID of the LSA's 1300 originator. The LS sequence number field 1335 is about four octets long and may be incremented by a router when a new LSA is being generated and may be employed to detect LSA duplications or old LSAs. The LS checksum field 1340 is about two octets long and indicates the checksum for the complete contents of LSA 1300. The length field 1345 is about two octets long and indicates the length of the LSA in bytes. The TLVs 1350 may be variable in length. A TLV encoded message may include a type field that may indicate the message type, followed by a length field that may indicate the size of the message value, and a variable-sized series of octets that carry the data for the message. The TLVs 1350 may comprise LSP path information, as discussed more fully below.

Figure 14:
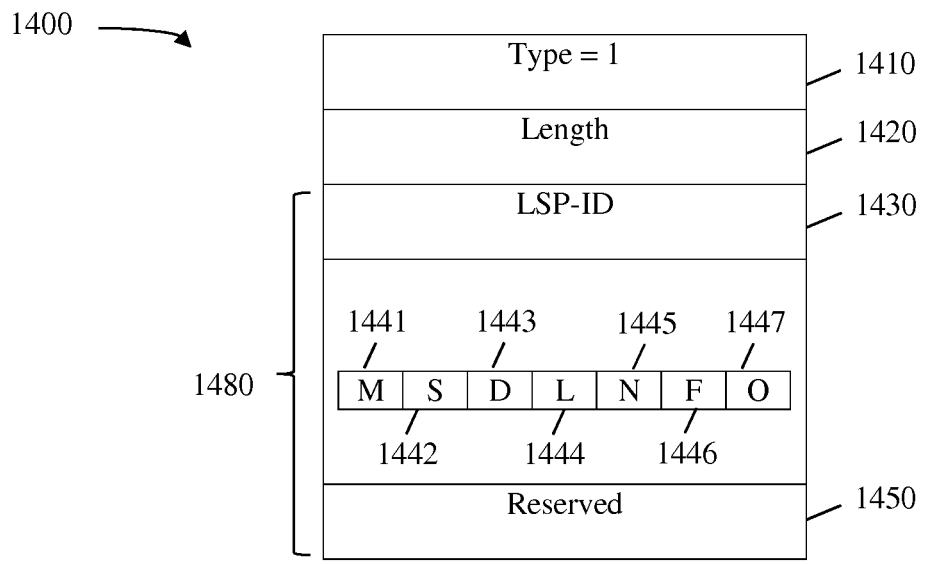
FIG. 14 is a schematic diagram illustrating an embodiment of a LSP-identifier (LSP-ID) Type-Length-Value (TLV).

FIG. 14 is a schematic diagram of an embodiment of a LSP-ID TLV 1400. The LSP-ID TLV 1400 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The LSP-ID TLV 1400 may be included in the TLVs 1350 of the LSA 1300. The LSP-ID TLV 1400 comprises a type field 1410, a length field 1420, and a value field 1480. The value field 1480 comprises a LSP-ID field 1430, an M flag 1441, an S flag 1442, a D flag 1443, a L flag 1444, an N flag 1445, an F flag 1446 and an O flag 1447, and a reserved field 1450. The type field 1410 is about two octets long and may be set to a value of one to indicate that the LSP-ID TLV 1400 is a LSP-ID TLV. The length field 1420 is about two octets long and indicates the length of the value field 1480. The LSP-ID field 1430 is about four octets long and indicates a LSP-ID identifying a LSP (e.g., a global ID of the LSP 332). The M flag 1441 is about one bit long and is set to a value of one to indicate that the LSP-ID identifies a P2MP LSP. The S flag 1442 is about one bit long and set to a value of one to indicate that the LSP identified by the LSP-ID is set up. The D flag 1443 is about one bit long and set to a value of one to indicate that the LSP identified by the LSP-ID is deleted. The L flag 1444 is about one bit long and set to a value of one to indicate that link protection is implemented for the LSP identified by the LSP-ID. The N flag 1445 is about one bit long and set to a value of one to indicate that node protection is implemented for LSP identified by the LSP-ID. The F flag 1446 is about one bit long and set to a value of one to indicate that facility protection is implemented for the LSP identified by the LSP-ID. The O flag 1447 is about one bit long and set to a value of one to indicate that a one-to-one protection is available for the LSP identified by the LSP-ID. The reserved field 1450 is about 25 bits long and is reserved for future use.

Figure 15:
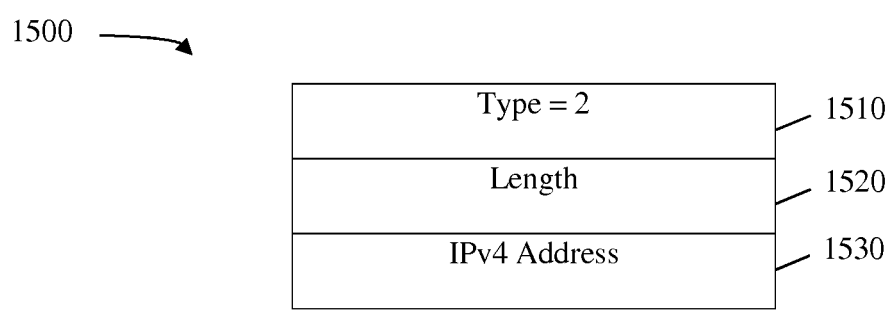
FIG. 15 is a schematic diagram of an embodiment of an Internet Protocol Version 4 (IPv4) destination address TLV.

FIG. 15 is a schematic diagram of an embodiment of an IPv4 destination address TLV 1500. The IPv4 destination address TLV 1500 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv4 destination address TLV 1500 may be included in the TLVs 1350 of the LSA 1300. The IPv4 destination address TLV 1500 comprises a type field 1510, a length field 1520, and an IPv4 address field 1530. The type field 1510 is about two octets long and is set to a value of two to indicate that the IPv4 destination address TLV 1500 is an IPv4 destination address TLV. The length field 1520 is about two octets long and indicates a length of the IPv4 address field 1530. The IPv4 address field 1530 is about four octets long and indicates an IPv4 address of a destination of a LSP. For example, the LSA 1300 may include the IPv4 destination address TLV 1500 to indicate the destination of the LSP such as the LSP 332.

Figure 16:
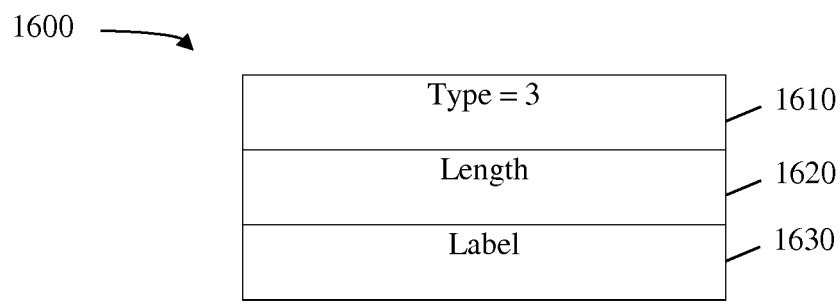
FIG. 16 is a schematic diagram of an embodiment of a label TLV.

FIG. 16 is a schematic diagram of an embodiment of a label TLV 1600. The label TLV 1600 is employed by edge nodes, such as the edge nodes 321, and/or internal nodes, such as the internal nodes 322, in a network zone, such as the network zone 350, to create and delete LSPs, such as the LSP 332, in the network zone. The label TLV 1600 may be included in the TLVs 1350 of the LSA 1300. The label TLV 1600 comprises a type field 1610, a length field 1620, and a label field 1630. The type field 1610 is about two octets long and is set to a value of three to indicate that the label TLV 1600 is a label TLV. The length field 1620 is about two octets long and indicates a length of the label field 1630. The label field 1630 is about four octets long and indicates a local label for a LSP, such as the LSP 332. For example, the local label is locally significant between two consecutive nodes along the LSP.

Figure 17:
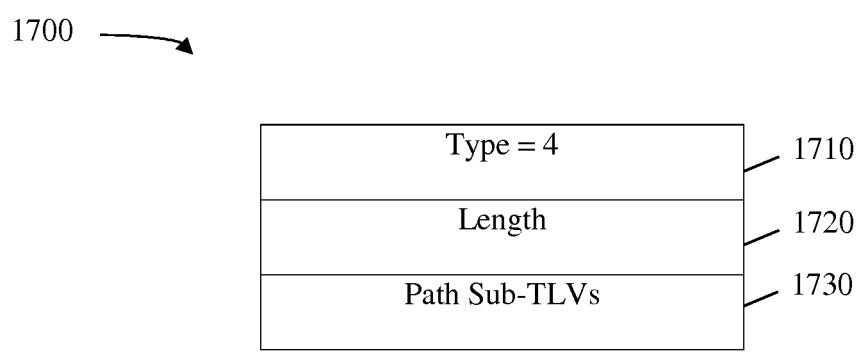
FIG. 17 is a schematic diagram of an embodiment of a path TLV.

FIG. 17 is a schematic diagram of an embodiment of a path TLV 1700. The path TLV 1700 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The path TLV 1700 may be included in the TLVs 1350 of the LSA 1300. The path TLV 1700 comprises a type field 1710, a length field 1720, and one or more path sub-TLVs 1730. The type field 1710 is about two octets long and is set to a value of four to indicate that the path TLV 1700 is a path TLV. The length field 1720 is about two octets long and indicates a length of the path sub-TLVs 1730. The path sub-TLVs 1730 may be variable in length and may comprise path information, such as a node list of path, as discussed more fully below.

Figure 18:
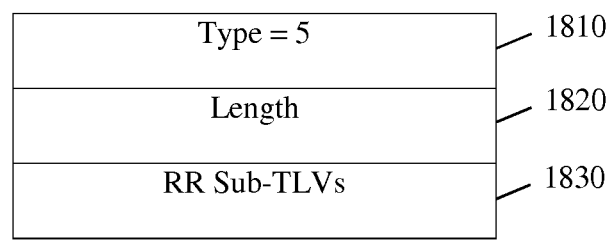
FIG. 18 is a schematic diagram of an embodiment of a Record-Route (RR) TLV.

FIG. 18 is a schematic diagram of an embodiment of an RR TLV 1800. The RR TLV 1800 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The RR TLV 1800 may be included in the TLVs 1350 of the LSA 1300. The RR TLV 1800 comprises a type field 1810, a length field 1820, and one or more RR sub-TLVs 1830. The type field 1810 is about two octets long and is set to a value of five to indicate that the RR TLV 1800 is a RR TLV. The length field 1820 is about two octets long and indicates a length of the RR sub-TLVs 1830. The RR sub-TLVs 1830 may be variable in length and may comprise a record of all the hops that the RR TLV 1800 has been routed through, as discussed more fully below.

Figure 19:
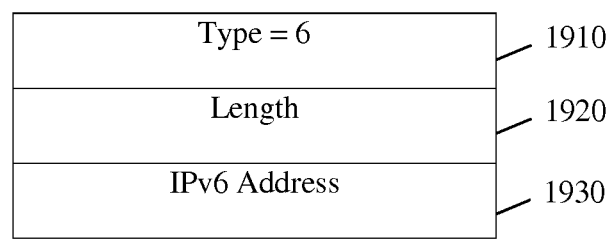
FIG. 19 is a schematic diagram of an embodiment of an Internet Protocol Version 6 (IPv6) destination address TLV.

FIG. 19 is a schematic diagram of an embodiment of an IPv6 destination address TLV 1900. The IPv6 destination address TLV 1900 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv6 destination address TLV 1900 may be included in the TLVs 1350 of the LSA 1300. The IPv6 destination address TLV 1900 comprises a type field 1910, a length field 1920, and an IPv6 address field 1930. The type field 1910 is about two octets long and is set to a value of six to indicate that the IPv6 destination address TLV 1900 is an IPv6 destination address TLV. The length field 1920 is about two octets long and indicates a length of the IPv6 address field 1930. The IPv6 address field 1930 is about sixteen octets long and indicates an IPv6 address of a destination of a LSP. For example, the LSA 1300 may include the IPv6 destination address TLV 1900 to indicate the destination of the LSP 332.

Figure 20:
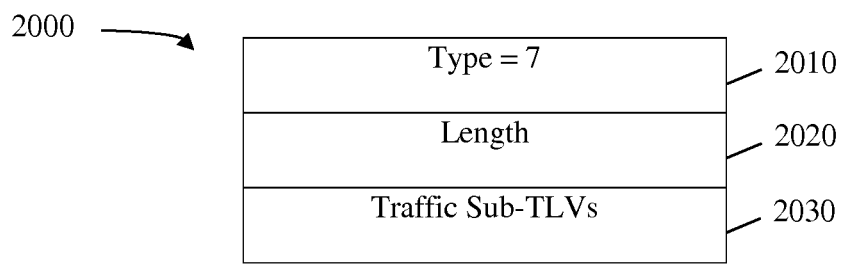
FIG. 20 is a schematic diagram of an embodiment of a traffic TLV.

FIG. 20 is a schematic diagram of an embodiment of a traffic TLV 2000. The traffic TLV 2000 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The traffic TLV 2000 may be included in the TLVs 1350 of the LSA 1300. The traffic TLV 2000 comprises a type field 2010, a length field 2020, and a traffic sub-TLVs 2030. The type field 2010 is about two octets long and is set to a value of seven to indicate that the traffic TLV 2000 is a traffic TLV. The length field 2020 is about two octets long and indicates a length of the traffic sub-TLVs 2030. The traffic sub-TLVs 2030 may be variable in length and comprise traffic class information, as discussed more fully below.

Figure 21:
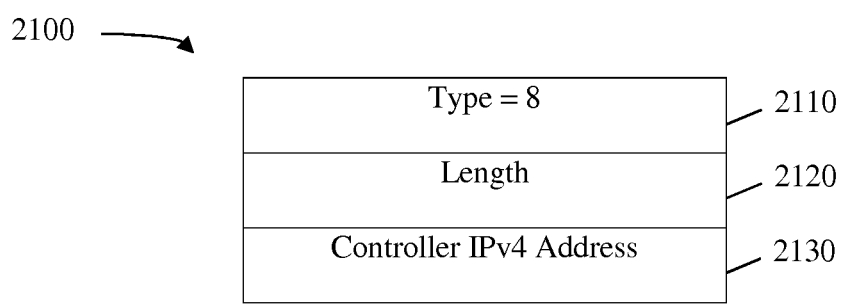
FIG. 21 is a schematic diagram of an embodiment of an IPv4 controller TLV.

FIG. 21 is a schematic diagram of an embodiment of an IPv4 controller TLV 2100. The IPv4 controller TLV 2100 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv4 controller TLV 2100 may be included in the TLVs 1350 of the LSA 1300. The IPv4 controller TLV 2100 comprises a type field 2110, a length field 2120, and a controller IPv4 address field 2130. The type field 2110 is about two octets long and is set to a value of eight to indicate that the IPv4 controller TLV 2100 is an IPv4 controller TLV. The length field 2120 is about two octets long and indicates a length of the controller IPv4 address field 2130. The controller IPv4 address field 2130 is about four octets long and indicates an IPv4 address of the ZR controller.

Figure 22:
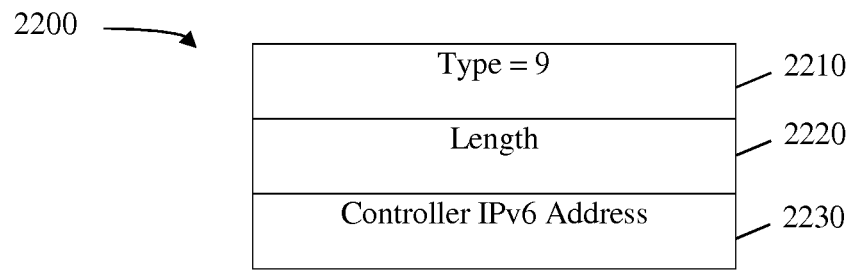
FIG. 22 is a schematic diagram of an embodiment of an IPv6 controller TLV.

FIG. 22 is a schematic diagram of an embodiment of an IPv6 controller TLV 2200. The IPv6 controller TLV 2200 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv6 controller TLV 2200 may be included in the TLVs 1350 of the LSA 1300. The IPv6 controller TLV 2200 comprises a type field 2210, a length field 2220, and a controller IPv6 address field 2230. The type field 2210 is about two octets long and is set to a value of nine to indicate that the IPv6 controller TLV 2200 is an IPv6 controller TLV. The length field 2220 is about two octets long and indicates a length of the controller IPv6 address field 2230. The controller IPv6 address field 2230 is about sixteen octets long and indicates an IPv6 address of the ZR controller.

Figure 23:
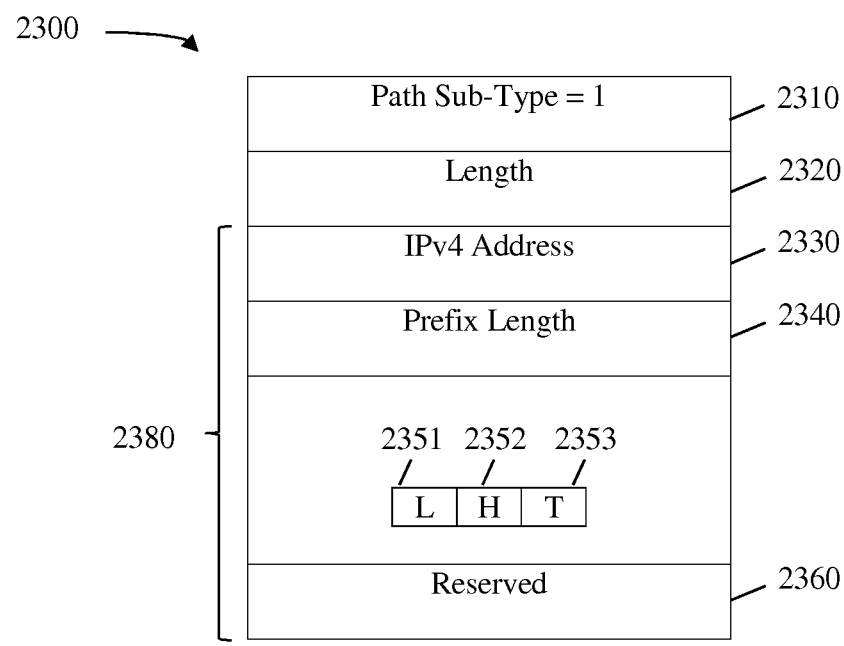
FIG. 23 is a schematic diagram of an embodiment of an IPv4 address path sub-TLV.

FIG. 23 is a schematic diagram of an embodiment of an IPv4 address path sub-TLV 2300. The IPv4 address path sub-TLV 2300 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv4 address path sub-TLV 2300 may be included in the path sub-TLVs 1730 of the path TLV 1700. The IPv4 address path sub-TLV 2300 comprises a path sub-type field 2310, a length field 2320, and a value field 2380. The value field 2380 comprises an IPv4 address field 2330, a prefix length field 2340, a L flag 2351, an H flag 2352, a T flag 2353, and a reserved field 2360. The path sub-type field 2310 is about two octets long and may be set to a value of one to indicate that the IPv4 address path sub-TLV 2300 is an IPv4 address path sub-TLV. The length field 2320 is about two octets long and indicates the length of the value field 2380. The IPv4 address field 2330 is about four octets long and indicates an IPv4 address, which may be the IPv4 address of an edge node or an internal node or an interface or a link. The prefix length field 2340 is about one octet long and indicates a prefix length (e.g., for a subnet). The L flag 2351 is about one bit long and is set to a value of one to indicate that the node identified by the IPv4 address is in a loose hop (e.g., transit nodes of a LSP). The H flag 2352 is about one bit long and set to a value of one to indicate that the node identified by the IPv4 address is a head of a LSP. The T flag 2353 is about one bit long and set to a value of one to indicate that the node identified by the IPv4 address is a tail of a LSP. The reserved field 2360 is about 21 bits long and is reserved for future use.

Figure 24:
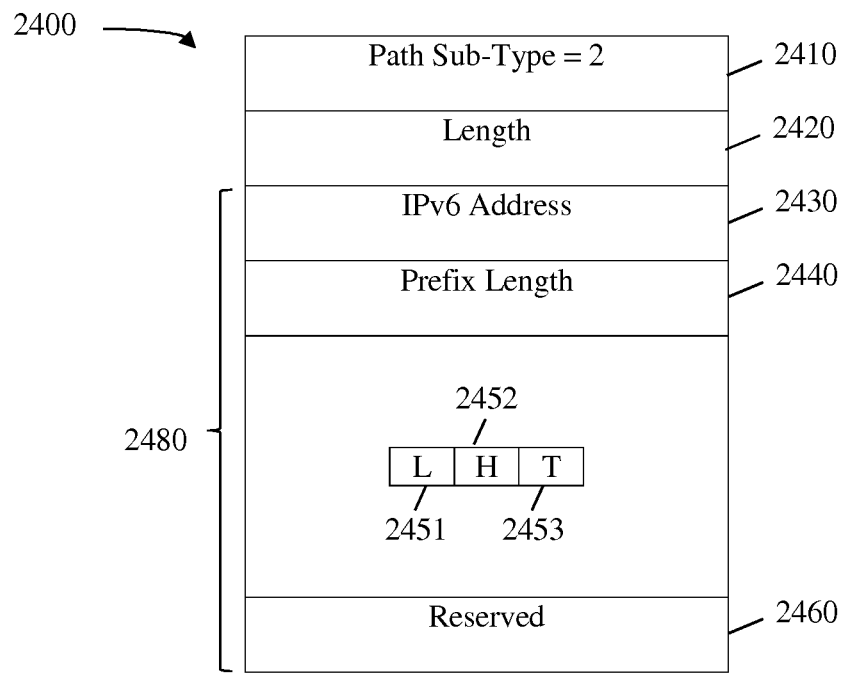
FIG. 24 is a schematic diagram of an embodiment of an IPv6 address path sub-TLV.

FIG. 24 is a schematic diagram of an embodiment of an IPv6 address path sub-TLV 2400. The IPv6 address path sub-TLV 2400 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv6 address path sub-TLV 2400 may be included in the path sub-TLVs 1730 of the path TLV 1700. The IPv6 address path sub-TLV 2400 comprises a path sub-type field 2410, a length field 2420, and a value field 2480. The value field 2480 comprises an IPv6 address field 2430, a prefix length field 2440, a L flag 2451, an H flag 2452, a T flag 2453, and a reserved field 2460. The path sub-type field 2410 is about two octets long and may be set to a value of two to indicate that the IPv6 address path sub-TLV 2400 is an IPv6 address path sub-TLV. The length field 2420 is about two octets long and indicates the length of the value field 2480. The IPv6 address field 2430 is about sixteen octets long and indicates an IPv6 address, which may be the IPv6 address of an edge node or an internal node or an interface or a link. The prefix length field 2440 is about one octet long and indicates a prefix length (e.g., for a subnet). The L flag 2451, the H flag 2452, and the T flag 2453 are similar to the L flag 2351, the H flag 2352, and the T flag 2353, respectively. The reserved field 2460 is about 21 bits long and is reserved for future use.

Figure 25:
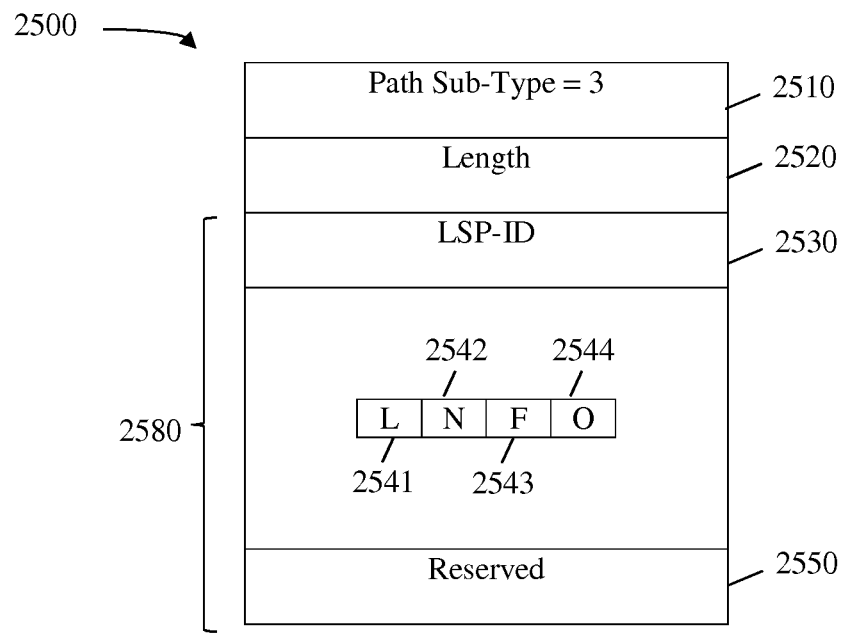
FIG. 25 is a schematic diagram of an embodiment of a LSP-ID path sub-TLV.

FIG. 25 is a schematic diagram of an embodiment of a LSP-ID path sub-TLV 2500. The LSP-ID path sub-TLV 2500 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The LSP-ID path sub-TLV 2500 may be included in the path sub-TLVs 1730 of the path TLV 1700. The LSP-ID path sub-TLV 2500 comprises a path sub-type field 2510, a length field 2520, and a value field 2580. The value field 2580 comprises a LSP-ID field 2530, a L flag 2541, an N flag 2542, an F flag 2543, an O flag 2544, and a reserved field 2550. The path sub-type field 2510 is about two octets long and may be set to a value of three to indicate that the LSP-ID path sub-TLV 2500 is a LSP-ID path sub-TLV. The length field 2520 is about two octets long and indicates the length of the value field 2580. The LSP-ID field 2530 is about four octets long and indicates a global ID of a LSP. The L flag 2541, the N flag 2542, the F flag 2543, and the O flag 2544 are similar to the L flag 1444, the N flag 1445, the F flag 1446, and the O flag 1447, respectively. The reserved field 2550 is about 28 bits long and is reserved for future use.

Figure 26:
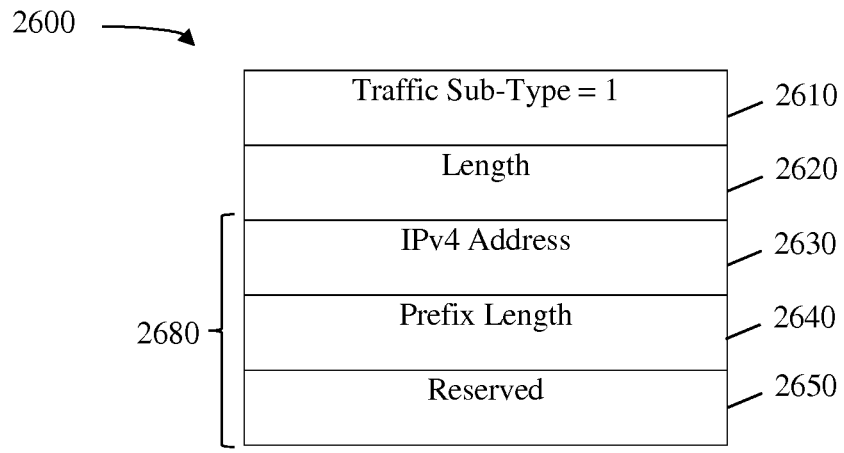
FIG. 26 is a schematic diagram of an embodiment of an IPv4 Forwarding Equivalence Class (FEC) sub-TLV.

FIG. 26 is a schematic diagram of an embodiment of an IPv4 FEC sub-TLV 2600. The IPv4 FEC sub-TLV 2600 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv4 FEC sub-TLV 2600 may be included in the traffic sub-TLVs 2030 of the traffic TLV 2000. The IPv4 FEC sub-TLV 2600 comprises a traffic sub-type field 2610, a length field 2620, and a value field 2680. The value field 2680 comprises an IPv4 address field 2630, a prefix length field 2640, and a reserved field 2650. The traffic sub-type field 2610 is about two octets long and may be set to a value of one to indicate that the IPv4 FEC sub-TLV 2600 is an IPv4 FEC sub-TLV. The length field 2620 is about two octets long and indicates the length of the value field 2680. The IPv4 address field 2630 is about four octets long and indicates an IPv4 address of a network node. For example, the network node may correspond to a destination node, such as the destination 160, of a data flow, where the IPv4 address with a prefix length may be employed as a match condition for data flow. The prefix length field 2640 is about one octet long and indicates a prefix length (e.g., for a subnet). The reserved field 2650 is about three octets long and is reserved for future use.

Figure 27:
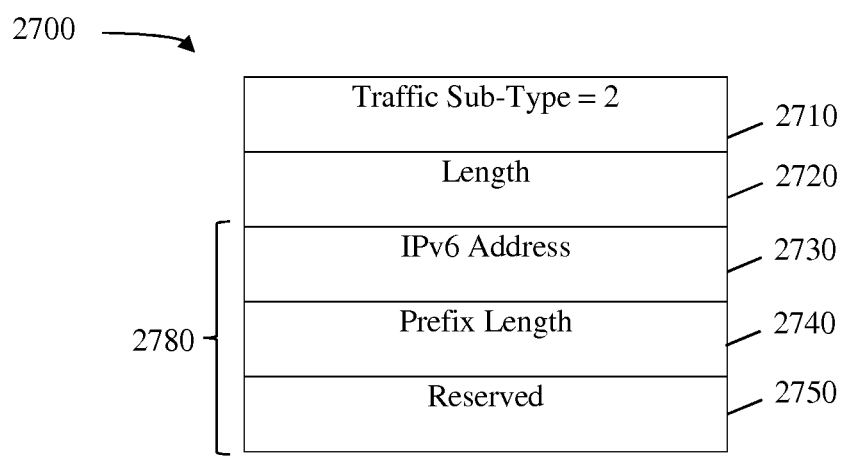
FIG. 27 is a schematic diagram of an embodiment of an IPv6 FEC sub-TLV.

FIG. 27 is a schematic diagram of an embodiment of an IPv6 FEC sub-TLV 2700. The IPv6 FEC sub-TLV 2700 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv6 FEC sub-TLV 2700 may be included in the traffic sub-TLVs 2030 of the traffic TLV 2000. The IPv6 FEC sub-TLV 2700 comprises a traffic sub-type field 2710, a length field 2720, and a value field 2780. The value field 2780 comprises an IPv6 address field 2730, a prefix length field 2740, and a reserved field 2750. The traffic sub-type field 2710 is about two octets long and may be set to a value of two to indicate that the IPv6 FEC sub-TLV 2700 is an IPv6 FEC sub-TLV. The length field 2720 is about two octets long and indicates the length of the value field 2780. The IPv6 address field 2730 is about sixteen octets long and indicates an IPv6 address of a network node. For example, the network node may correspond to a destination node, such as the destination 160, of a data flow, where the IPv6 address with a prefix length may be employed as a match condition for data flow. The prefix length field 2740 is about one octet long and indicates a prefix length (e.g., for a subnet). The reserved field 2750 is about three octets long and is reserved for future use.

Figure 28:
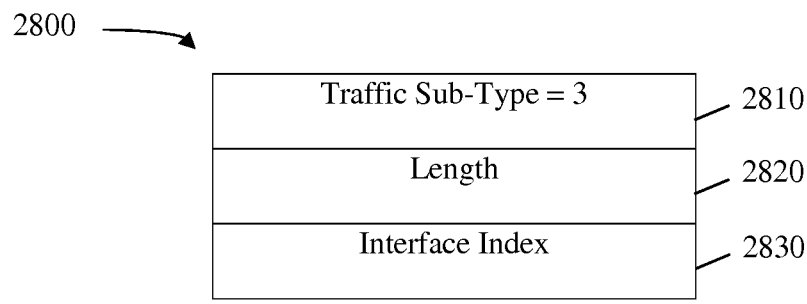
FIG. 28 is a schematic diagram of an embodiment of an interface index sub-TLV.

FIG. 28 is a schematic diagram of an embodiment of an interface index sub-TLV 2800. The interface index sub-TLV 2800 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The interface index sub-TLV 2800 may be included in the traffic sub-TLVs 2030 of the traffic TLV 2000. The interface index sub-TLV 2800 comprises a traffic sub-type field 2810, a length field 2820, and an interface index field 2830. The traffic sub-type field 2810 is about two octets long and may be set to a value of three to indicate that the interface index sub-TLV 2800 is an interface index sub-TLV. The length field 2820 is about two octets long and indicates the length of the interface index field 2830. The interface index field 2830 is about four octets long and indicates an interface index, which may be employed for identifying a particular data flow.

Figure 29:
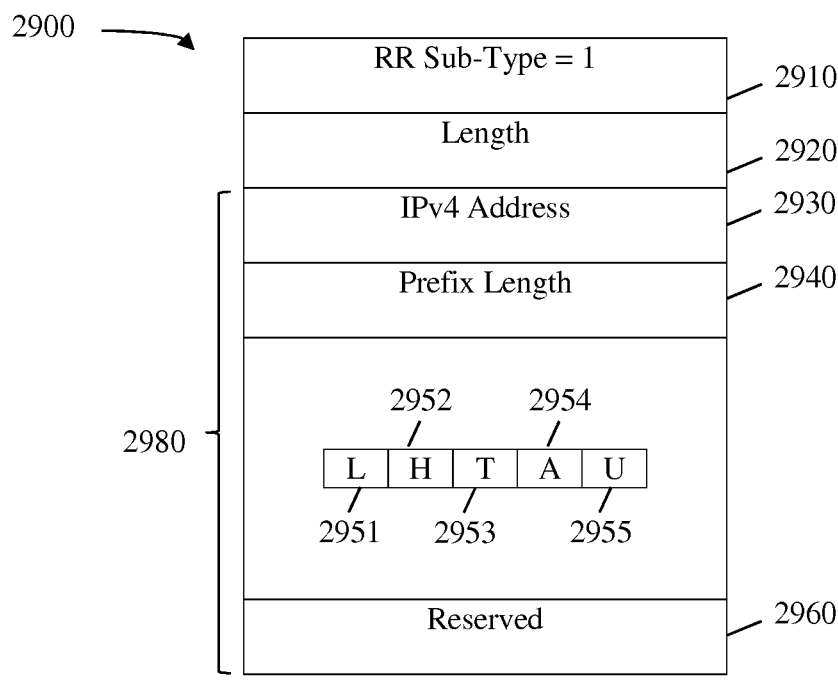
FIG. 29 is a schematic diagram of an embodiment of an IPv4 address RR sub-TLV.

FIG. 29 is a schematic diagram of an embodiment of an IPv4 address RR sub-TLV 2900. The IPv4 address RR sub-TLV 2900 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv4 address RR sub-TLV 2900 may be included in the RR sub-TLVs 1830 of the RR TLV 1800. The IPv4 address RR sub-TLV 2900 comprises a RR sub-type field 2910, a length field 2920, and a value field 2980. The value field 2980 comprises an IPv4 address field 2930, a prefix length field 2940, a L flag 2951, an H flag 2952, a T flag 2953, an A flag 2954, a U flag 2955, and a reserved field 2960. The RR sub-type field 2910 is about two octets long and may be set to a value of one to indicate that the IPv4 address RR sub-TLV 2900 is an IPv4 address RR sub-TLV. The length field 2920 is about two octets long and indicates the length of the value field 2980. The IPv4 address field 2930, the prefix length field 2940, the L flag 2951, the H flag 2952, and the T flag 2953 are similar to the IPv4 address field 2330, the prefix length fields 2340 and 2440, the L flags 2351 and 2451, the H flags 2352 and 2452, the T flags 2353 and 2453, respectively. The A flag 2954 is about one bit long and set to a value of one to indicate that protection is available at the downstream link of the node identified by the IPv4 address. The U flag 2955 is about one bit long and set to a value of one to indicate that protection is in use at the downstream link of the node identified by the IPv4 address. The reserved field 2960 is about 19 bits long and is reserved for future use.

Figure 30:
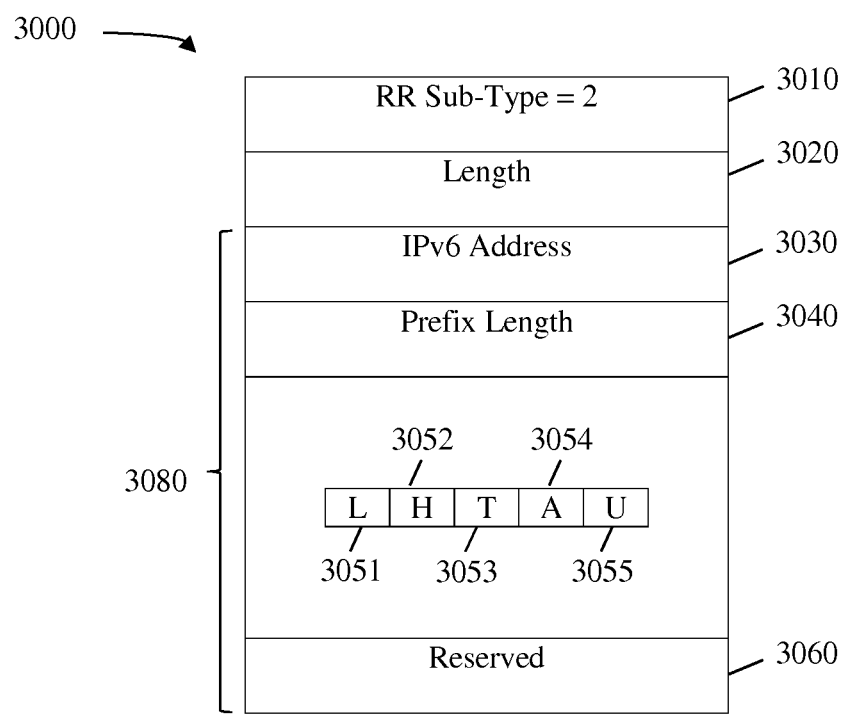
FIG. 30 is a schematic diagram of an embodiment of an IPv6 address RR sub-TLV.

FIG. 30 is a schematic diagram of an embodiment of an IPv6 address RR sub-TLV 3000. The IPv6 address RR sub-TLV 3000 is employed by a ZR controller, such as the ZR controller 310, edge nodes, such as the edge nodes 321, and/or internal nodes, such as the internal nodes 322, in a network zone, such as the network zone 350, to create and delete LSPs, such as the LSP 332, in the network zone. The IPv6 address RR sub-TLV 3000 may be included in the RR sub-TLVs 1830 of the RR TLV 1800. The IPv6 address RR sub-TLV 3000 comprises a RR sub-type field 3010, a length field 3020, and a value field 3080. The value field 3080 comprises an IPv6 address field 3030, a prefix length field 3040, a L flag 3051, an H flag 3052, a T flag 3053, an A flag 3054, a U flag 3055, and a reserved field 3060. The RR sub-type field 3010 is about two octets long and may be set to a value of two to indicate that the IPv6 address RR sub-TLV 3000 is an IPv6 address RR sub-TLV. The length field 3020 is about two octets long and indicates the length of the value field 3080. The IPv6 address field 3030 is similar to the IPv6 address field 2430. The prefix length field 3040 is similar to the prefix length fields 2340, 2440, and 2940. The L flag 3051 is similar to the L flags 2351, 2451, and 2951. The H flag 3052 is similar to the H flags 2352, 2452, and 2952. The T flag 3053 is similar to the T flags 2353, 2453, and 2953. The A flag 3054 is similar to the A flag 2954. The U flag 3055 is similar to the U flag 2955. The reserved field 3060 is about 19 bits long and is reserved for future use.

In an embodiment, a ZR controller, such as the ZR controller 310, may send a LSA, such as the LSA 1300, to an egress node, such as the edge node PE4 321, of a LSP, such as the LSP 332, to request creation or deletion of the LSP. The LSA may include a LSP-ID TLV, such as the LSP-ID TLV 1400, an IPv4 destination TLV, such as the IPv4 destination TLV 1500, a path TLV, such as the path TLV 1700, a traffic TLV, such as the traffic TLV 2000, and an IPv4 controller TLV, such as the IPv4 controller TLV 2100. The path TLV may include a plurality of path sub TLVs such as the path sub TLV 2300 for the IPv4 addresses of the nodes the LSP traverses. To create a LSP, the LSA may indicate a LSP creation request, for example, in a LSA action field, such as the LSP action field 1320. To delete a LSP, the LSA may indicate a LSP deletion request, for example, in a LSA action field, such as the LSP action field 1320. The egress node and other transit nodes, such as the internal nodes 322, along the LSP may send a LSA to a next upstream node along the LSP to request creation and/or deletion of the LSP. The LSA sent by the egress node or the transit nodes may be substantially similar to a LSA sent by the ZR controller, but may comprise a label TLV, such as the label TLV 1600, and the path TLV may include addresses of a portion of the LSP (e.g., ends at the receiving node). The ingress node of the LSP may send a LSA to the ZR controller to indicate a LSP creation and/or a deletion status. The LSA sent by the ingress node may comprise a LSP-ID TLV, such as the LSP-ID TLV 1400, with the S flag, such as the S flag 1442, set to one indicating that the LSP is set up or the D flag, such as the D flag 1443, set to one indicating that the LSP is deleted.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. An apparatus for zone routing, comprising:
a transmitter;
a receiver; and
a processor coupled to the transmitter and the receiver, wherein the processor is configured to:
determine a path through a network, wherein the path extends from an ingress edge node of the network to a first egress edge node of the network;
obtain a global identifier (ID) for identifying a label-switched path (LSP) along the path;
send, via the transmitter, a first LSP creation request message to the first egress edge node requesting creation of the LSP along the path, wherein the first LSP creation request message comprises the global ID;
receive, via the receiver, a LSP creation response message from the ingress edge node indicating a creation status of the LSP along the path in response to the first LSP creation request message, wherein the path is a point-to-multipoint (P2MP) path, wherein the path further extends from the ingress edge node to a second egress edge node that is different from the first egress edge node; and
wherein the processor is further configured to send, via the transmitter, a second LSP creation request message to the second egress edge node requesting creation of the LSP from the ingress edge node to the second egress edge node, and wherein the second LSP creation request message comprises the global ID.

2. The apparatus of claim 1, wherein the processor is further configured to determine the path by performing a constrained shortest path first (CSPF) computation from the ingress edge node to the first egress edge node.

3. The apparatus of claim 1, wherein the path is for a point-to-point (P2P) LSP, wherein the global ID is unique in the network, and wherein the processor is further configured to obtain the global ID by allocating the global ID from a P2P LSP database (LSPDB) of the network.

4. The apparatus of claim 1, wherein the path is for a point-to-multipoint (P2MP) LSP, wherein the global ID is unique in the network, and wherein the processor is further configured to obtain the global ID by allocating the global ID from a P2MP LSP database (LSPDB) of the network.

5. The apparatus of claim 1, wherein the processor is further configured to receive a LSP set up request from an application requesting set up of the LSP for forwarding a data flow, and wherein the first LSP creation request message further comprises a traffic class for identifying the data flow.

6. The apparatus of claim 1, wherein the processor is further configured to:

send, via the transmitter, a LSP deletion request message to the first egress edge node requesting deletion of the LSP from the network, wherein the LSP deletion request message comprises the global ID; and receive, via the receiver, a LSP deletion response message from the ingress edge node indicating a deletion status of the LSP in response to the LSP deletion request message.

7. The apparatus of claim 1, wherein the path traverses through one or more internal nodes of the network, wherein the transmitter is not coupled to the internal nodes of the network, wherein the receiver is not coupled to the internal nodes of the network, and wherein the first LSP creation request message further comprises an ordered node sequence for the ingress edge node, the internal nodes, and the first egress edge node along the path.

8. A method by a zone routing controller executing computer instructions stored in memory, the method comprising:

determining a path through a network, wherein the path extends from an ingress edge node of the network to a first egress edge node of the network;

obtaining a global identifier (ID) for identifying a label-switched path (LSP) along the path;

sending, via a transmitter, a first LSP creation request message to the first egress edge node requesting creation of the LSP along the path, wherein the first LSP creation request message comprises the global ID;

receiving, via a receiver, a LSP creation response message from the ingress edge node indicating a creation status of the LSP along the path in response to the first LSP creation request message, wherein the path is a point-to-multipoint (P2MP) path, wherein the path further extends from the ingress edge node to a second egress edge node that is different from the first egress edge node; and sending a second LSP creation request message to the second egress edge node requesting creation of the LSP from the ingress edge node to the second egress edge node, wherein the second LSP creation request message comprises the global ID.

9. The method of claim 8, further comprising determining the path by performing a constrained shortest path first (CSPF) computation from the ingress edge node to the first egress edge node.

10. The method of claim 8, wherein the path is for a point-to-point (P2P) LSP, the global ID is unique in the network, and the method further comprising obtaining the global ID by allocating the global ID from a P2P LSP database (LSPDB) of the network.

11. The method of claim 8, wherein the path is for a point-to-multipoint (P2MP) LSP, the global ID is unique in the network, and the method further comprising obtaining the global ID by allocating the global ID from a P2MP LSP database (LSPDB) of the network.

12. The method of claim 8, further comprising receiving a LSP set up request from an application requesting set up of the LSP for forwarding a data flow, and wherein the first LSP creation request message further comprises a traffic class for identifying the data flow.

13. The method of claim 8, further comprising:

sending an LSP deletion request message to the first egress edge node requesting deletion of the LSP from the network, wherein the LSP deletion request message comprises the global ID; and receiving an LSP deletion response message from the ingress edge node indicating a deletion status of the LSP in response to the LSP deletion request message.

14. The method of claim 8, wherein the path traverses through one or more internal nodes of the network, wherein the first LSP creation request message further comprises an ordered node sequence for the ingress edge node, the internal nodes, and the first egress edge node along the path.

\* \* \* \* \*